(12) United States Patent
Sasaki et al.

(10) Patent No.: US 11,147,301 B2
(45) Date of Patent: Oct. 19, 2021

(54) MANUFACTURING METHOD FOR LIQUID SEASONING CONTAINING OIL PHASE AND WATER PHASE

(71) Applicant: KAO CORPORATION, Tokyo (JP)

(72) Inventors: Aya Sasaki, Sumida-ku (JP); Daisuke Shiiba, Funabashi (JP); Shinpei Fukuhara, Kamisu (JP); Minoru Kase, Kamisu (JP)

(73) Assignee: KAO CORPORATION, Tokyo (JP)

( * ) Notice: Subject to any disclaimer, the term of this patent is extended or adjusted under 35 U.S.C. 154(b) by 296 days.

(21) Appl. No.: 15/321,957

(22) PCT Filed: Jun. 23, 2015

(86) PCT No.: PCT/JP2015/068089
§ 371 (c)(1),
(2) Date: Dec. 23, 2016

(87) PCT Pub. No.: WO2015/199094
PCT Pub. Date: Dec. 30, 2015

(65) Prior Publication Data
US 2017/0150747 A1 Jun. 1, 2017

(30) Foreign Application Priority Data

Jun. 24, 2014 (JP) .............................. JP2014-129550

(51) Int. Cl.
*A23L 27/60* (2016.01)
*A23D 7/005* (2006.01)
*A23L 5/10* (2016.01)
*C11B 3/14* (2006.01)

(52) U.S. Cl.
CPC .............. *A23L 27/60* (2016.08); *A23D 7/005* (2013.01); *A23D 7/0053* (2013.01); *A23L 5/13* (2016.08); *C11B 3/14* (2013.01); *A23V 2002/00* (2013.01)

(58) Field of Classification Search
CPC .......... A23L 27/60; A23L 5/13; A23D 7/005; A23D 7/0053; C11B 3/14; A23V 2002/00
See application file for complete search history.

(56) References Cited

U.S. PATENT DOCUMENTS

| | | | |
|---|---|---|---|
| 5,855,944 A | 1/1999 | Koschinski et al. | |
| 6,147,237 A | 11/2000 | Zwanenburg et al. | |
| 2011/0033594 A1 | 2/2011 | Murano et al. | |
| 2012/0259133 A1 | 10/2012 | Homma et al. | |
| 2012/0301583 A1 | 11/2012 | Nakada et al. | |
| 2013/0012733 A1 | 1/2013 | Abe et al. | |
| 2014/0121397 A1 | 5/2014 | Kase et al. | |
| 2016/0000108 A1 | 1/2016 | Nakada et al. | |

FOREIGN PATENT DOCUMENTS

| | | |
|---|---|---|
| CN | 102770519 A | 11/2012 |
| JP | 7-305088 A | 11/1995 |
| JP | 8-154576 A | 6/1996 |
| JP | 9-235584 A | 9/1997 |
| JP | 2005-110674 A | 4/2005 |
| JP | 2005-204653 A | 8/2005 |
| JP | 2009-268369 A | 11/2009 |
| JP | 2011-195621 A | 10/2011 |
| JP | 2011-205924 A | 10/2011 |
| JP | 2011-213856 A | 10/2011 |
| JP | 2012-201771 A | 10/2012 |
| JP | 2013-18970 A | 1/2013 |
| JP | 2013-49829 A | 3/2013 |
| JP | 5168749 B2 | 3/2013 |
| JP | 2014-140332 A | 8/2014 |
| JP | 2017-6064 A | 1/2017 |
| WO | WO 93/10207 A1 | 5/1993 |
| WO | 01/96506 A1 | 12/2001 |
| WO | WO 2011/102477 A1 | 8/2011 |

OTHER PUBLICATIONS

International Search Report dated Sep. 29, 2015, in PCT/JP2015/068089, filed Jun. 23, 2015.
Extended Search Report dated Jan. 2, 2018 in European Patent Application No. 15811991.7.

*Primary Examiner* — Subbalakshmi Prakash
(74) *Attorney, Agent, or Firm* — Oblon, McClelland, Maier & Neustadt, L.L.P.

(57) ABSTRACT

Provided are a liquid seasoning in which degradation of taste and flavor due to storage is suppressed, and a method of producing the same. The method of producing a liquid seasoning comprises the following steps (1), (2), and (3): (1) at a temperature of 80° C. or less, adding an aqueous solution of at least one selected from the group consisting of ascorbic acid, hydroxyacid, and salts thereof to a fat or oil and stirring the mixture; (2) bringing the fat or oil after the step (1) into contact with water vapor under reduced pressure; and (3) bringing the fat or oil obtained in the step (2) as an oil phase component into contact with an aqueous phase.

16 Claims, No Drawings

MANUFACTURING METHOD FOR LIQUID SEASONING CONTAINING OIL PHASE AND WATER PHASE

FIELD OF THE INVENTION

The present invention relates to a method of producing a liquid seasoning that contains an oil phase and an aqueous phase.

BACKGROUND OF THE INVENTION

A liquid seasoning, such as a dressing, which contains an oil phase and an aqueous phase, is typically produced by preparing an aqueous phase containing water and then bringing the aqueous phase into contact with an oil phase containing a fat or oil. The liquid seasoning is required to have high stability, but the fat or oil is oxidized with time by oxygen in air, resulting in significantly degrading its taste and flavor.

Then, there has been conventionally carried out an attempt to fill a liquid seasoning into a resin container with low oxygen permeability or an attempt to incorporate an antioxidant into a liquid seasoning, thereby preventing degradation of taste and flavor owing to oxidation of the fat or oil.

Meanwhile, as a technology for improving oxidation stability of an edible oil, such as an oil for cooking, there have been investigated a technology involving incorporating, into a fat or oil, an organic acid that is poorly soluble in the fat or oil, and a technology involving injecting an inert gas, such as nitrogen, into an oil to contain it in a form of fine bubbles. For example, there have been reported: a method of producing a fat or oil that is used for deep frying or frying and has suppressed heating odor and/or heating degradation odor generated in heating, the method including adding a predetermined amount of ascorbic acid, erythorbic acid, or malic acid to a fat or oil as an aqueous solution and subjecting the resultant to dehydration treatment under reduced pressure condition (Patent Document 1); a method of producing a fat or oil containing an organic acid and/or a salt thereof, the method including adding an organic acid and/or a salt thereof in powdery form to a fat or oil, stirring the resultant under predetermined conditions, and then filtering the resultant to obtain a clear fat or oil (Patent Document 2); a fat or oil composition containing predetermined amounts of a phosphorous component and ascorbic acid and/or an ascorbic acid derivative (Patent Document 3); a method of producing an edible oil, including incorporating nitrogen gas as nano-bubbles and micro-bubbles each having a predetermined size into an edible oil (Patent Document 4); and a fat or oil composition in which a part of dissolved gas has been replaced by carbon dioxide, and the concentration of dissolved gas other than carbon dioxide, such as nitrogen and oxygen, is from 8.6 mg/L to 17.2 mg/L (Patent Document 5).

In addition, there has been reported a method of producing a glyceride composition, including adding, in a deodorization step, a predetermined amount of citric acid, ascorbic acid, or citric acid monoglyceride to a glyceride composition, thereby suppressing autoxidation of a fat or oil and production of reversing matter during a storage under a low temperature (Patent Document 6).

[Patent Document 1] WO 2001/096506 A1
[Patent Document 2] JP-A-2012-201771
[Patent Document 3] JP-A-2011-205924
[Patent Document 4] JP-A-2009-268369
[Patent Document 5] JP-A-2014-140332
[Patent Document 6] JP-A-2013-49829

SUMMARY OF THE INVENTION

According to the present invention, there is provided a method of producing a liquid seasoning (hereinafter referred to as method a), comprising the following steps (1), (2), and (3):

(1) at a temperature of 80° C. or less, adding an aqueous solution of at least one selected from the group consisting of ascorbic acid, hydroxy acid, and salts thereof to a fat or oil and stirring the mixture;

(2) bringing the fat or oil after the step (1) into contact with water vapor under reduced pressure; and (3) bringing the fat or oil obtained in the step (2) as an oil phase component into contact with an aqueous phase.

Further, according to one embodiment of the present invention, there is provided a liquid seasoning, comprising: an oil phase that contains a fat or oil obtained by a method comprising the following steps (1) and (2); and an aqueous phase:

(1) at a temperature of 80° C. or less, adding an aqueous solution of at least one selected from the group consisting of ascorbic acid, hydroxy acid, and salts thereof to a fat or oil and stirring the mixture; and (2) bringing the fat or oil after the step (1) into contact with water vapor under reduced pressure.

Further, according to one embodiment of the present invention, there is provided a method of producing a liquid seasoning (hereinafter referred to as method b), comprising the following steps (4), (5), and (6):

(4) adding an aqueous solution of at least one selected from the group consisting of ascorbic acid, hydroxyacid, and salts thereof to a fat or oil, and subjecting the mixture to bubbling with an inert gas and stirring;

(5) bringing the fat or oil after the step (4) into contact with water vapor under reduced pressure; and (6) bringing the fat or oil obtained in the step (5) as an oil phase component into contact with an aqueous phase.

Further, according to one embodiment of the present invention, there is provided a liquid seasoning, comprising: an oil phase that contains a fat or oil obtained by a method comprising the following steps (4) and (5); and an aqueous phase:

(4) adding an aqueous solution of at least one selected from the group consisting of ascorbic acid, hydroxy acid, and salts thereof to a fat or oil, and subjecting the mixture to bubbling with an inert gas and stirring; and (5) bringing the fat or oil after the step (4) into contact with water vapor under reduced pressure.

DETAILED DESCRIPTION OF THE INVENTION

However, when a fat or oil having a high degree of unsaturation is used as an oil phase to prepare a liquid seasoning comprising an oil phase and an aqueous phase, the taste and flavor of the liquid seasoning is not maintained sufficiently during storage by a conventional method.

Accordingly, the present invention relates to providing a liquid seasoning in which degradation of taste and flavor due to storage is suppressed, and a method of producing the same.

The inventors of the present invention made an attempt to incorporate an organic acid in advance into an oil phase for preparation of a liquid seasoning comprising an oil phase and an aqueous phase, and found that it was able to suppress time-dependent oxidation of the oil phase itself but was not able to suppress time-dependent degradation of the taste and flavor of a liquid seasoning using the oil phase. Then, the inventors further made extensive investigations, and as a result, found that time-dependent degradation of a liquid seasoning was able to be suppressed by, at a temperature of 80° C. or less, adding an aqueous solution of a predetermined organic acid to a fat or oil to be used as an oil phase and bringing the resultant into contact with water vapor under predetermined conditions, or by adding an aqueous solution of a predetermined organic acid to a fat or oil to be used as an oil phase, subjecting the resultant to bubbling with an inert gas and stirring, and bringing the resultant into contact with water vapor under predetermined conditions.

According to the present invention, it is possible to provide a liquid seasoning that has good taste and flavor even after storage and comprises an oil phase and an aqueous phase.

A method of producing a liquid seasoning disclosed as the method a of the present invention comprises: the step (1) of, at a temperature of 80° C. or less, adding an aqueous solution of at least one selected from the group consisting of ascorbic acid, hydroxy acid, and salts thereof to a fat or oil and stirring the mixture; the step (2) of bringing the fat or oil after the step (1) into contact with water vapor under reduced pressure; and the step (3) of bringing the fat or oil obtained in the step (2) as an oil phase component into contact with an aqueous phase.

In addition, the liquid seasoning of the present invention comprises an oil phase that contains a fat or oil obtained by a method comprising the steps (1) and (2) and an aqueous phase.

[Step (1)]

In the method a of the present invention, first, at a temperature of 80° C. or less, an aqueous solution of at least one selected from the group consisting of ascorbic acid, hydroxy acid, and salts thereof is added to a fat or oil and the mixture is stirred.

The fat or oil to be subjected to the method a of the present invention is not particularly limited as long as the fat or oil can be used as an edible fat or oil, and examples thereof may include the following fat or oil: plant-derived fat or oil, such as soybean oil, rapeseed oil, safflower oil, rice oil, corn oil, sunflower oil, cotton seed oil, olive oil, sesame oil, peanut oil, Job's tears oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao fat, sal fat, shea fat, and algae oil; animal-derived fat or oil, such as fish oil, lard, beef tallow, and butter fat; or transesterified oils, hydrogenated oils, and fractionated oils thereof, or the like. The oils may each be used alone or may be mixed appropriately before use. Of those, from the viewpoint of usability, a liquid fat or oil excellent in low-temperature resistance is preferably used, one or two or more selected from the group consisting of vegetable oils, such as soybean oil, rapeseed oil, safflower oil, corn oil, sunflower oil, cotton seed oil, olive oil, sesame oil, peanut oil, Job's tears oil, wheat germ oil, Japanese basil oil, linseed oil, and perilla oil, algae oil, and fish oil are more preferably used, and one or two or more selected from the group consisting of linseed oil, perilla oil, algae oil, and fish oil are even more preferably used. Further, one or two or more selected from the group consisting of linseed oil, perilla oil, algae oil, and fish oil, and one or two or more selected from the group consisting of soybean oil, rapeseed oil, safflower oil, corn oil, sunflower oil, cotton seed oil, olive oil, and sesame oil are preferably mixed before use, one or two or more selected from the group consisting of linseed oil, algae oil, and fish oil, and one or two or more selected from the group consisting of soybean oil, rapeseed oil, sunflower oil, olive oil, and sesame oil are more preferably mixed before use, and linseed oil and rapeseed oil, or fish oil and rapeseed oil are even more preferably mixed before use.

The content of the fat or oil selected from the group consisting of linseed oil, perilla oil, fish oil, and algae oil is preferably 1 mass % (hereinafter referred to as "%") or more, more preferably 2% or more, more preferably 3% or more, even more preferably 5% or more, and is preferably 75% or less, more preferably 50% or less, more preferably 20% or less, even more preferably 15% or less, with respect to the total amount of the fat or oil to be subjected to the step (1). In addition, the content of linseed oil and/or perilla oil is preferably 5% or more, more preferably 10% or more, even more preferably 15% or more, and is preferably 90% or less, more preferably 80% or less, even more preferably 70% or less, with respect to the total amount of the fat or oil to be subjected to the step (1). In addition, the content of linseed oil and/or perilla oil is preferably from 5% to 90%, more preferably from 10% to 80%, even more preferably from 15% to 70%, with respect to the total amount of the fat or oil to be subjected to the step (1).

In addition, the content of one or two or more of fat or oil selected from the group consisting of fish oil and algae oil is preferably 1% or more, more preferably 2% or more, more preferably 3% or more, even more preferably 5% or more, and is preferably 100% or less, more preferably 80% or less, more preferably 50% or less, even more preferably 25% or less, with respect to the total amount of the fat or oil to be subjected to the step (1). The content of one or two or more of fat or oil selected from the group consisting of fish oil and algae oil is preferably from 1% to 100%, more preferably from 2% to 80%, more preferably from 3% to 50%, even more preferably from 5% to 25%, with respect to the total amount of the fat or oil to be subjected to the step (1). The term "fish oil" refers to a fat or oil derived from an aquatic animal, and the fish oil can be collected from a raw material such as sardine, herring, saury, mackerel, tuna, squid, or cod liver. In addition, the edible fat or oil is preferably a refined fat or oil via a refinement step.

The liquid fat or oil means a fat or oil that is liquid at 20° C., when subjected to a cold test in accordance with Standard Methods for Analysis of Oils and Fats 2.3.8-27.

The fatty acids constituting the fat or oil are not particularly limited and may be a saturated fatty acid or an unsaturated fatty acid. The ratio of the unsaturated fatty acid in the constituent fatty acids is preferably from 60% to 100%, more preferably from 70% to 100%, more preferably from 75% to 99%, even more preferably from 80% to 98%, from the viewpoint of allowing the effect of the present invention to be exhibited effectively. The unsaturated fatty acid has preferably from 14 to 24 carbon atoms, more preferably from 16 to 22 carbon atoms, from the viewpoint of a physiological effect. The constituent fatty acids include preferably a polyunsaturated fatty acid from the viewpoint of allowing the effect of the present invention to be exhibited effectively, more preferably a polyunsaturated fatty acid selected from the group consisting of α-linolenic acid (C18:3, ALA), eicosapentaenoic acid (C20:5, EPA), and docosahexaenoic acid (C22:6, DHA).

The step (1) is carried out at a temperature of 80° C. or less, from the viewpoints of suppressing time-dependent degradation of the taste and flavor of the liquid seasoning and the storage stability of the liquid seasoning. The temperature in the step (1) is preferably 75° C. or less, more preferably 70° C. or less, and from the viewpoint of promoting contact of the fat or oil with ascorbic acid, hydroxy acid, or a salt thereof, is preferably 15° C. or more, more preferably 20° C. or more, even more preferably 40° C. or more. The temperature in the step (1) is preferably from 15° C. to 80° C., more preferably from 20° C. to 75° C., even more preferably from 40° C. to 70° C.

As a method of bringing the fat or oil into contact with ascorbic acid, hydroxy acid, or a salt thereof at a desired temperature, there may be a method involving separately adjusting the temperatures of the fat or oil and the aqueous solution of the organic acid and then bringing the fat or oil into contact with the aqueous solution. On the other hand, a method involving adding the aqueous solution of the organic acid to the fat or oil and adjusting the temperature of the mixture by heating is easy and preferred. The temperature in the step (1) may be measured by measurement of the temperature of the fat or oil after addition of the aqueous solution of the organic acid.

The hydroxy acid to be used in the present invention is a collective term including a compound having a carboxyl group and an alcoholic hydroxy group in one molecule, and examples thereof include lactic acid, tartaric acid, malic acid, and citric acid. The ascorbic acid includes L-ascorbic acid and erythorbic acid, which are stereoisomers.

As the salts of ascorbic acid and hydroxy acid, alkali metal salts are preferred, sodium salts and potassium salts are more preferred, and sodium salts are even more preferred.

Of those, one or more selected from the group consisting of L-ascorbic acid, citric acid, tartaric acid, erythorbic acid, and salts thereof are preferred, one or more selected from the group consisting of L-ascorbic acid, erythorbic acid, and salts thereof are more preferred, and sodium L-ascorbate is even more preferred as ascorbic acid, hydroxy acid, or a salt thereof, from the viewpoints of the storage stability and taste and flavor of the liquid seasoning.

When a water washing step to be described later is carried out in the method a, the concentration of the aqueous solution of ascorbic acid, hydroxy acid, or a salt thereof is preferably 0.1% or more, more preferably 0.2% or more, from the viewpoint of storage stability, and is preferably 20% or less, more preferably 10% or less, more preferably 5% or less, even more preferably 2% or less, from the viewpoint of the taste and flavor of the liquid seasoning. In addition, the concentration of the aqueous solution of ascorbic acid, hydroxy acid, or a salt thereof is preferably from 0.1% to 20%, more preferably from 0.2% to 10%, more preferably from 0.2% to 5%, even more preferably from 0.2% to 2%.

In addition, when the water washing step is carried out, the addition amount of the aqueous solution of ascorbic acid, hydroxy acid, or a salt thereof is preferably 10% or more, more preferably 20% or more, even more preferably 30% or more, with respect to the fat or oil, from the viewpoint of the storage stability of the liquid seasoning, and is preferably 100% or less, more preferably 80% or less, even more preferably 60% or less, with respect to the fat or oil, from the viewpoint of industrial productivity. In addition, the addition amount of the aqueous solution of ascorbic acid, hydroxy acid, or a salt thereof is preferably from 10% to 100%, more preferably from 20% to 80%, even more preferably from 30% to 60%, with respect to the fat or oil.

When the water washing step to be described later is not carried out in the method a, the concentration of the aqueous solution of ascorbic acid, hydroxy acid, or a salt thereof is preferably 0.00001% or more, more preferably 0.00002% or more, more preferably 0.00005% or more, even more preferably 0.0001% or more, from the viewpoint of the storage stability of the liquid seasoning, and is preferably 1% or less, more preferably 0.5% or less, more preferably 0.2% or less, more preferably 0.1% or less, more preferably 0.01% or less, more preferably 0.001% or less, even more preferably 0.0003% or less, from the viewpoint of the taste and flavor of the liquid seasoning. In addition, the concentration of the aqueous solution of ascorbic acid, hydroxy acid, or a salt thereof is preferably from 0.00001% to 1%, more preferably from 0.00002% to 0.5%, more preferably from 0.00005% to 0.2%, more preferably from 0.0001% to 0.1%, more preferably from 0.0001% to 0.01%, more preferably from 0.0001% to 0.001%, even more preferably from 0.0001% to 0.0003%.

In addition, when the water washing step is not carried out, the addition amount of the aqueous solution of ascorbic acid, hydroxy acid, or a salt thereof is preferably 1% or more, more preferably 2% or more, even more preferably 3% or more, with respect to the fat or oil, from the viewpoint of the storage stability of the liquid seasoning, and is preferably 10% or less, more preferably 8% or less, even more preferably 6% or less, with respect to the fat or oil, from the viewpoint of industrial productivity. In addition, the addition amount of the aqueous solution of ascorbic acid, hydroxy acid, or a salt thereof is preferably from 1% to 10%, more preferably from 2% to 8%, even more preferably from 3% to 6%, with respect to the fat or oil.

The conditions of stirring may be appropriately adjusted, and are preferably adjusted to a condition of from 200 r/min to 1,000 r/min and from 10 minutes to 5 hours. In addition, the temperature in stirring is preferably from 15° C. to 80° C., more preferably from 20° C. to 75° C., even more preferably from 40° C. to 70° C., from the viewpoint of promoting contact of the fat or oil with ascorbic acid, hydroxy acid, or a salt thereof to an extent that degradation of the fat or oil is not accelerated. This procedure is preferably carried out under a stream of an inert gas, such as nitrogen.

As means for separating the fat or oil from the aqueous phase after stirring to obtain the fat or oil, for example, static separation or centrifugation is given. The separation conditions may be appropriately adjusted, and are preferably adjusted to a condition of ordinary pressure, from 3,000 r/min to 10,000 r/min, and from 5 minutes to 30 minutes.

In addition, subsequently, dehydration by pressure reduction may be carried out. The conditions of dehydration may be appropriately adjusted, and are preferably adjusted to a condition of, for example, from 60° C. to 90° C. and from 0.01 kPa to 5 kPa.

[Step (2)]

Next, a treatment to bring the fat or oil after the step (1) into contact with water vapor under reduced pressure is carried out.

As a method of bringing the fat or oil into contact with water vapor, steam distillation under reduced pressure is given, and the method thereof may be a batchwise method, a semi-continuous method, a continuous method, or the like. When the amount of the fat and oil to be treated is small, the batchwise method is preferably adopted, and when the amount is large, the semi-continuous method or the continuous method is preferably adopted.

As an apparatus for the semi-continuous method, for example, a Girdler type deodorization apparatus including a deodorization tower having several trays may be used. This apparatus is configured to perform a treatment by supplying a fat or oil from the upper of the apparatus, performing contact of the fat or oil with water vapor on a tray for an appropriate period of time, and then transferring the fat or oil to the next lower tray so that the fat or oil are successively moved down intermittently.

As an apparatus for the continuous method, for example, a thin-film deodorization apparatus in which a fat or oil in a thin-film form can be brought into contact with water vapor may be used.

The fat or oil is brought into contact with water vapor at a temperature of preferably 70° C. or more, more preferably 100° C. or more, more preferably 130° C. or more, more preferably 150° C. or more, even more preferably 160° C. or more, from the viewpoint of deodorization efficiency, and is preferably 200° C. or less, more preferably 190° C. or less, even more preferably 180° C. or less, from the viewpoint of suppressing production of trans acid. In addition, the fat or oil is brought into contact with water vapor at a temperature of preferably from 70° C. to 200° C., more preferably from 100° C. to 190° C., more preferably from 130° C. to 180° C., more preferably from 150° C. to 180° C., even more preferably from 160° C. to 180° C. In the preset invention, the temperature at the time of contact of the fat or oil with water vapor is the temperature of the fat or oil to be brought into contact with water vapor.

The period of time for contact of the fat or oil with water vapor is preferably 0.5 minute or more, more preferably 5 minutes or more, more preferably 10 minutes or more, even more preferably 20 minutes or more, from the viewpoint of deodorization efficiency, and is preferably 90 minutes or less, more preferably 60 minutes or less, more preferably 50 minutes or less, even more preferably 40 minutes or less, from the viewpoint of suppressing production of trans acid. In addition, the period of time for contact of the fat or oil with water vapor is preferably from 0.5 minute to 90 minutes, more preferably from 5 minutes to 60 minutes, more preferably from 10 minutes to 50 minutes, even more preferably from 20 minutes to 40 minutes.

In addition, the pressure at the time of contact of the fat or oil with water vapor is a reduced pressure, and is preferably 5 kPa or less, more preferably from about 0.01 kPa to about 4 kPa, even more preferably from about 0.03 kPa to about 1 kPa, from the viewpoints of deodorization efficiency and industrial productivity.

The amount of water vapor to be brought into contact with the fat or oil is preferably from 0.3%/hr to 20%/hr, more preferably from 0.5%/hr to 10%/hr, with respect to the fat or oil, from the viewpoints of deodorization efficiency and industrial productivity.

In the method a of the present invention, prior to the step (2), a water washing step of bringing the fat or oil into contact with water, to thereby perform oil-water separation, may be carried out. When the water washing step is carried out, a liquid seasoning having even better taste and flavor can be obtained.

As a method of bringing the fat or oil into contact with water, for example, a batch method involving mixing the fat or oil with water, stirring the mixture, and separating the resultant by filtration. This procedure is preferably carried out under a stream of an inert gas, such as nitrogen.

As water, there are given, for example, tap water, purified water, distilled water, and ion-exchange water.

In the method a, the usage amount of water is preferably 1% or more, more preferably 3% or more, even more preferably 5% or more, with respect to the fat or oil, and is preferably 50% or less, more preferably 30% or less, even more preferably 20% or less, with respect to the fat or oil, from the viewpoint of sufficient removal of water-soluble components. In addition, the usage amount of water is preferably from 1% to 50%, more preferably from 3% to 30%, even more preferably from 5% to 20%, with respect to the fat or oil. The usage amount of water is an amount used for each washing with water.

The temperature of water is preferably 80° C. or less, more preferably from 40° C. to 80° C., even more preferably from 50° C. to 75° C., from the viewpoint of sufficient contact of the fat or oil with water.

The period of time for washing with water is preferably from 1 minute to 120 minutes, more preferably from 5 minutes to 60 minutes, even more preferably from 15 minutes to 30 minutes, from the viewpoint of sufficient contact of the fat or oil with water. The period of time for washing with water is one required for each washing with water.

The washing with water may be carried out once or a plurality of times, and may be repeated twice or three times, for example.

As means for separating the fat or oil from the aqueous phase after washing with water, for example, static separation or centrifugation is given.

The separation conditions may be appropriately adjusted, and are preferably adjusted to a condition of ordinary pressure, from 3,000 r/min to 10,000 r/min, and from 5 minutes to 30 minutes.

In addition, subsequently, dehydration by pressure reduction is preferably carried out. The conditions of dehydration may be appropriately adjusted, and are preferably adjusted to a condition of, for example, from 60° C. to 90° C. and from 0.01 kPa to 5 kPa.

[Step (3)]

Next, the fat or oil obtained in the step (2) is brought into contact with the aqueous phase, as an oil phase component. When an emulsified composition is produced, it is preferred that, after mixing of the oil phase component and the aqueous phase, the mixture be preliminarily emulsified, if necessary, and homogenized. As a homogenizer, there may be given, for example, a high-pressure homogenizer, an ultrasonic emulsifier, a colloid mill, Agihomomixer, and a milder.

In addition, when a separate-type liquid seasoning in which an oil phase and an aqueous phase are separated is produced, it is preferred that the aqueous phase and the oil phase be separately filled into a container.

The oil phase of the liquid seasoning of the present invention produced by the method a may contain the above-mentioned edible fat or oil in addition to the fat or oil obtained in the step (2), and preferably contains only the fat or oil obtained in the step (2) as a fat or oil of the oil phase component. The ratio of the fat or oil obtained in the step (2) in the oil phase is preferably from 90% to 100%, more preferably from 95% to 100%, even more preferably 100%, with respect to the total amount of the fat or oil.

A method of producing a liquid seasoning disclosed as the method b of the present invention comprises the step (4) of adding an aqueous solution of at least one selected from the group consisting of ascorbic acid, hydroxy acid, and salts thereof to a fat or oil and subjecting the mixture to bubbling with an inert gas and stirring, the step (5) of bringing the fat or oil after the step (4) into contact with water vapor under reduced pressure, and the step (6) of bringing, as an oil phase component, the fat or oil obtained in the step (5) into contact with an aqueous phase.

In addition, the liquid seasoning of the present invention comprises an oil phase that contains the fat or oil obtained by a method comprising the steps (4) and (5) and an aqueous phase.

[Step (4)]

In the method b of the present invention, first, an aqueous solution of at least one selected from the group consisting of ascorbic acid, hydroxy acid, and salts thereof is added to a fat or oil.

The fat or oil to be subjected to the method b of the present invention is the same as the edible fat or oil in the step (1) of the method a.

Of those, as the fat or oil to be subjected to the method b, a liquid fat or oil excellent in low-temperature resistance is preferably used from the viewpoint of usability, and one or two or more selected from the group consisting of vegetable oils, such as soybean oil, rapeseed oil, safflower oil, corn oil, sunflower oil, cotton seed oil, olive oil, sesame oil, peanut oil, Job's tears oil, wheat germ oil, Japanese basil oil, linseed oil, and perilla oil, algae oils, and fish oils are more preferably used, one or two or more selected from the group consisting of linseed oil, perilla oil, algae oil, and fish oil are more preferably used, and fish oil is even more preferably used, from the viewpoint of allowing the effect of the present invention to be exhibited effectively.

When the fish oil is used, the ratio thereof is preferably 75% or more, more preferably 85% or more, even more preferably 95% or more, with respect to the total amount of the fat or oil to be subjected to the step (4). The term "fish oil" refers to a fat or oil derived from an aquatic animal, and the fish oil can be collected from a raw material such as sardine, herring, saury, mackerel, tuna, squid, or cod liver.

When a mixture of two or more of fat or oil is used, one or two or more selected from the group consisting of linseed oil, perilla oil, algae oil, and fish oil is preferably mixed with one or two or more selected from the group consisting of soybean oil, rapeseed oil, safflower oil, corn oil, sunflower oil, cotton seed oil, olive oil, and sesame oil, more preferably one or two or more selected from the group consisting of linseed oil, algae oil, and fish oil is mixed with one or two or more selected from the group consisting of soybean oil, rapeseed oil, sunflower oil, olive oil, and sesame oil, even more preferably linseed oil is mixed with rapeseed oil or fish oil is mixed with rapeseed oil.

The fat or oil to be subjected to the method of the present invention may be subjected to deoxygenation treatment through bubbling with an inert gas or deaeration under reduced pressure. The dissolved oxygen concentration of the fat or oil after the deoxygenation treatment is preferably 10 ppm or less, more preferably 5 ppm or less, even more preferably 3 ppm or less, from the viewpoints of the storage stability and taste and flavor of the liquid seasoning.

The step (4) is preferably carried out under the same temperature condition as that in the step (1), that is, at a temperature of 80° C. or less, from the viewpoints of suppressing time-dependent degradation of the taste and flavor of the liquid seasoning and the storage stability of the liquid seasoning.

The temperature in the step (4) is preferably 75° C. or less, more preferably 70° C. or less, and is preferably 15° C. or more, more preferably 20° C. or more, from the viewpoint of promoting contact of the fat or oil with ascorbic acid, hydroxy acid, or a salt thereof. The temperature in the step (4) is preferably from 15° C. to 80° C., more preferably from 15° C. to 75° C., even more preferably from 20° C. to 70° C.

The hydroxy acid to be used in the method b is the same as that used in the step (1) of the method a.

Of those, the hydroxy acid is preferably citric acid from the viewpoints of the storage stability and taste and flavor of the liquid seasoning.

When a water washing step to be described later is carried out in the method b, the concentration of the aqueous solution of ascorbic acid, hydroxy acid, or a salt thereof is preferably 0.1% or more, more preferably 0.2% or more, more preferably 0.5% or more, even more preferably 1% or more, from the viewpoint of storage stability, and is preferably 20% or less, more preferably 10% or less, more preferably 5% or less, even more preferably 3% or less, from the viewpoint of the taste and flavor of the liquid seasoning. In addition, the concentration of the aqueous solution of ascorbic acid, hydroxy acid, or a salt thereof is preferably from 0.1% to 20%, more preferably from 0.2% to 10%, more preferably from 0.5% to 5%, even more preferably from 1% to 3%.

In addition, when the water washing step is carried out, the addition amount of the aqueous solution of ascorbic acid, hydroxy acid, or a salt thereof is preferably 10% or more, more preferably 20% or more, even more preferably 30% or more, with respect to the fat or oil, from the viewpoint of the storage stability of the liquid seasoning, and is preferably 100% or less, more preferably 80% or less, even more preferably 60% or less, with respect to the fat or oil, from the viewpoint of industrial productivity. In addition, the addition amount of the aqueous solution of ascorbic acid, hydroxy acid, or a salt thereof is preferably from 10% to 100%, more preferably from 20% to 80%, even more preferably from 30% to 60%, with respect to the fat or oil.

When the water washing step to be described later is not carried out in the method b, the concentration of the aqueous solution of ascorbic acid, hydroxy acid, or a salt thereof is preferably 0.00001% or more, more preferably 0.0001% or more, from the viewpoint of the storage stability of the liquid seasoning, and is preferably 1% or less, more preferably 0.5% or less, more preferably 0.2% or less, more preferably 0.1% or less, more preferably 0.01% or less, even more preferably 0.001% or less, from the viewpoint of the taste and flavor of the liquid seasoning. In addition, the concentration of the aqueous solution of ascorbic acid, hydroxy acid, or a salt thereof is preferably from 0.00001% to 1%, more preferably from 0.0001% to 0.5%, more preferably from 0.0001% to 0.2%, more preferably from 0.0001% to 0.1%, more preferably from 0.0001% to 0.01%, even more preferably from 0.0001% to 0.001%.

In addition, when the water washing step is not carried out, the addition amount of the aqueous solution of ascorbic acid, hydroxy acid, or a salt thereof is preferably 1% or more, more preferably 2% or more, even more preferably 3% or more, with respect to the fat or oil, from the viewpoint of the storage stability of the liquid seasoning, and is preferably 10% or less, more preferably 8% or less, even more preferably 6% or less, with respect to the fat or oil, from the viewpoint of industrial productivity. In addition, the addition amount of the aqueous solution of ascorbic acid, hydroxy acid, or a salt thereof is preferably from 1% to 10%, more preferably from 2% to 8%, even more preferably from 3% to 6%, with respect to the fat or oil.

In the step (4), the fat or oil is brought into contact with ascorbic acid, hydroxy acid, or a salt thereof, and then the resultant is subjected to bubbling with an inert gas and stirring. The bubbling is a gas-liquid contact method, and in general, the term refers to blowing of an inert gas into a liquid. The inert gas is preferably blown from the lower side of the fat or oil with stirring from the viewpoint of efficiency of gas-liquid contact.

As the inert gas, for example, argon gas or nitrogen gas is given, and nitrogen gas is preferred.

The flow rate of the inert gas is preferably 0.1 L/hr or more, more preferably 0.2 L/hr or more, more preferably 0.5 L/hr or more, even more preferably 2 L/hr or more, with respect to 1 kg of the fat or oil, from the viewpoints of the storage stability and taste and flavor of the liquid seasoning. In addition, the flow rate of the inert gas is preferably 50 L/hr or less, more preferably 40 L/hr or less, even more preferably 30 L/hr or less, with respect to 1 kg of the fat or oil, from the view point of industrial productivity. In addition, the flow rate of the inert gas is preferably from 0.1 L/hr to 50 L/hr, more preferably from 0.2 L/hr to 40 L/hr, more preferably from 0.5 L/hr to 30 L/hr, even more preferably from 2 L/hr to 30 L/hr, with respect to 1 kg of the fat or oil.

The stirring conditions may be appropriately adjusted.

The period of time for bubbling and stirring is preferably from 10 minutes to 5 hours, more preferably from 1 hour to 3 hours. In addition, the temperature of this procedure is preferably from 15° C. to 80° C., more preferably from 15° C. to 75° C., even more preferably from 20° C. to 70° C., from the viewpoint of promoting contact of the fat or oil with ascorbic acid, hydroxy acid, or a salt thereof to an extent that degradation of the fat or oil is not accelerated.

As described in the foregoing, as means for separating the fat or oil from the aqueous phase after stirring to obtain the fat or oil, for example, static separation or centrifugation is given. The separation conditions may be appropriately adjusted, and are preferably adjusted to the following conditions: from 10 minutes to 60 minutes of standing at the temperature in the stirring or from 5 minutes to 30 minutes at from 3,000 r/min to 10,000 r/min, under ordinary pressure.

In addition, subsequently, dehydration by pressure reduction may be carried out. The conditions of dehydration may be appropriately adjusted, and are preferably adjusted to a condition of, for example, from 60° C. to 90° C. and from 0.01 kPa to 5 kPa.

[Step (5)]

Next, a treatment to bring the fat or oil after the step (4) into contact with water vapor under reduced pressure is carried out.

The step (5) of the method b may be carried out in the same manner as in the step (2) of the method a and may be carried out using the same apparatus.

In the step (5), the fat or oil is brought into contact with water vapor at a temperature of preferably 70° C. or more, more preferably 100° C. or more, more preferably 130° C. or more, even more preferably 150° C. or more, from the viewpoint of deodorization efficiency, and is preferably 230° C. or less, more preferably 210° C. or less, even more preferably 190° C. or less, from the viewpoint of suppressing production of trans acid. In addition, the fat or oil is brought into contact with water vapor at a temperature of preferably from 70° C. to 230° C., more preferably from 100° C. to 210° C., more preferably from 130° C. to 190° C., even more preferably from 150° C. to 190° C. The temperature at the time of contact of the fat or oil with water vapor is the temperature of the fat or oil to be brought into contact with water vapor.

The period of time for contact of the fat or oil with water vapor is preferably 1 minute or more, more preferably 10 minutes or more, more preferably 20 minutes or more, even more preferably 30 minutes or more, from the viewpoint of deodorization efficiency, and is preferably 300 minutes or less, more preferably 240 minutes or less, even more preferably 180 minutes or less, from the viewpoint of suppressing production of trans acid. In addition, the period of time for contact of the fat or oil with water vapor is preferably from 1 minute to 300 minutes, more preferably from 10 minutes to 240 minutes, more preferably from 20 minutes to 180 minutes, even more preferably from 30 minutes to 180 minutes.

In addition, the pressure at the time of contact of the fat or oil with water vapor is a reduced pressure, and is preferably 5 kPa or less, more preferably from about 0.01 kPa to about 5 kPa, more preferably from about 0.05 kPa to about 4 kPa, even more preferably from about 0.1 kPa to about 3 kPa, from the viewpoints of deodorization efficiency and industrial productivity.

The amount of water vapor to be brought into contact with the fat or oil is preferably from 0.3%/hr to 20%/hr, more preferably from 0.5%/hr to 10%/hr, even more preferably from 1%/hr to 5%/hr, with respect to the fat or oil, from the viewpoints of deodorization efficiency and industrial productivity.

At the time of contact of the fat or oil with water vapor in the method of the present invention, an extract of rosemary (*Rosmarinus officinalis* L.) may be incorporated into the fat or oil.

The addition amount of the rosemary extract, with respect to the fat or oil to be subjected to the step (5), is preferably 0.001% or more, more preferably 0.01% or more, even more preferably 0.1% or more, from the viewpoint of antioxidative property, and is preferably 5% or less, more preferably 3% or less, even more preferably 1% or less, from the viewpoint of taste and flavor. In addition, the addition amount of the rosemary extract is preferably from 0.001% to 5%, more preferably from 0.01% to 3%, even more preferably from 0.1% to 1%, with respect to the fat or oil. The rosemary extract may have a form with a purity of about 100% or a form obtained by dilution with a solvent used for extraction. The amount of the rosemary extract in the present invention is based on the purity of the rosemary extract excluding an amount of the solvent used for dilution.

In the method b of the present invention, prior to the step (5), a water washing step of bringing the fat or oil into contact with water, to thereby perform oil-water separation, may be carried out. When the water washing step is carried out, a liquid seasoning having even better taste and flavor can be obtained.

As a method of bringing the fat or oil into contact with water, there is given, for example, a batchwise method involving mixing the fat or oil with water, stirring the mixture, and separating the resultant by filtration. This procedure is preferably carried out under a stream of an inert gas, such as nitrogen. In addition, bubbling with an inert gas is preferably carried out from the viewpoint of the storage stability of the liquid seasoning.

The flow rate of the inert gas is preferably 0.1 L/hr or more, more preferably 0.2 L/hr or more, more preferably 0.5 L/hr or more, even more preferably 2 L/hr or more, with respect to 1 kg of the fat or oil. In addition, the flow rate of the inert gas is preferably 50 L/hr or less, more preferably 40 L/hr or less, even more preferably 30 L/hr or less, with respect to 1 kg of the fat or oil, from the viewpoint of industrial productivity.

As water, there are given, for example, tap water, purified water, distilled water, and ion-exchange water.

Water may be subjected to deoxygenation treatment in advance through bubbling with an inert gas or deaeration under reduced pressure before contact of the fat or oil with water. The dissolved oxygen concentration of water after the deoxygenation treatment is preferably 10 ppm or less, more preferably 5 ppm or less, even more preferably 3 ppm or less, from the viewpoint of the storage stability of the liquid seasoning.

In the method b, the usage amount of water is preferably 1% or more, more preferably 3% or more, even more preferably 5% or more, with respect to the fat or oil, and is preferably 100% or less, more preferably 90% or less, even more preferably 80% or less, with respect to the fat or oil, from the viewpoint of sufficient removal of water-soluble components. In addition, the usage amount of water is preferably from 1% to 100%, more preferably from 3% to 90%, even more preferably from 5% to 80%, with respect to the fat or oil. The usage amount of water is an amount used for each washing with water.

The temperature of water is preferably 80° C. or less, more preferably from 40° C. to 80° C., even more preferably from 50° C. to 75° C., from the viewpoint of sufficient contact of the fat or oil with water.

The period of time for washing with water is preferably from 1 minute to 120 minutes, more preferably from 5 minutes to 60 minutes, even more preferably from 15 minutes to 30 minutes, from the viewpoint of sufficient contact of the fat or oil with water. The period of time for washing with water is one required for each washing with water.

The washing with water may be carried out once or a plurality of times, and may be repeated twice or three times, for example.

As described in the foregoing, as means for separating the fat or oil from the aqueous phase after washing with water, for example, static separation or centrifugation is given.

The separation conditions may be appropriately adjusted, and are preferably adjusted to the following conditions: from 10 minutes to 60 minutes of standing at the temperature in the washing with water or from 5 minutes to 30 minutes at from 3,000 r/min to 10,000 r/min, under ordinary pressure.

In addition, subsequently, dehydration by pressure reduction is preferably carried out. The conditions of dehydration may be appropriately adjusted, and are preferably adjusted to a condition of, for example, from 60° C. to 90° C. and from 0.01 kPa to 5 kPa.

[Step (6)]

Next, the fat or oil as an oil phase component obtained in the step (5) is brought into contact with the aqueous phase. As in the step (3), when an emulsified composition is produced, it is preferred that, after mixing of the oil phase component and the aqueous phase, the mixture be preliminarily emulsified, if necessary, and homogenized. As a homogenizer, there may be given, for example, a high-pressure homogenizer, an ultrasonic emulsifier, a colloid mill, Agihomomixer, and a milder.

In addition, when a separate-type liquid seasoning in which an oil phase and an aqueous phase are separated is produced, it is preferred that the aqueous phase and the oil phase be separately filled into a container.

The oil phase of the liquid seasoning of the present invention produced by the method b may contain the above-mentioned edible fat or oil in addition to the fat or oil obtained in the step (5). A mixing ratio between the fat or oil obtained in the step (5) and the edible fat or oil other than the fat or oil obtained in the step (5) may be appropriately set, and the ratio of the fat or oil obtained in the step (5) is preferably from 1 mass % to 100 mass %, more preferably from 3 mass % to 60 mass %, even more preferably from 5 mass % to 20 mass %, with respect to the total amount of the fat or oil.

Thus, the liquid seasoning can be obtained by the method a and the method b.

The liquid seasoning of the present invention preferably comprises egg yolk. The egg yolk may have any form, for example, a form of raw egg yolk, frozen egg yolk, egg yolk powder, salted egg yolk, or sugared egg yolk, or may be blended in the form of whole egg containing egg white. In addition, the egg yolk may be subjected to enzymatic treatment before use.

The egg yolk is preferably incorporated into the aqueous phase in the step (3) or the step (6) to produce a liquid seasoning.

When the liquid seasoning is an emulsified composition, the content of egg yolk in the liquid seasoning is preferably from 0.1% to 20%, more preferably from 0.5% to 17%, more preferably from 0.5% to 15%, even more preferably from 1% to 15%, in terms of the amount of liquid egg yolk, from the viewpoints of the improvement in taste and flavor and the emulsification stability. When the liquid seasoning is a mayonnaise product or a mayonnaise-like food, the content of egg yolk in the liquid seasoning is preferably from 5% to 20%, more preferably from 7% to 17%, more preferably from 8% to 15%, even more preferably from 10% to 15%, in terms of the amount of liquid egg yolk, from the viewpoints of the improvement in taste and flavor and the emulsification stability.

When the liquid seasoning is a separate-type liquid seasoning, the content of egg yolk in the liquid seasoning is preferably less than 1%, more preferably less than 0.5%, more preferably less than 0.3%, even more preferably less than 0.1%, from the viewpoint of maintaining a separate state of the oil phase and the aqueous phase.

The pH (20° C.) of the aqueous phase part falls within the range of preferably 5.5 or less, more preferably from 2.5 to 5.5, more preferably from 3 to 5, even more preferably from 3.2 to 4.5, from the viewpoint of storage stability. To decrease the pH to the range, vinegar, an organic acid, such as citric acid or malic acid, an inorganic acid, such as phosphoric acid, or a citrus juice, such as lemon juice, may be used, and the vinegar is preferably used from the viewpoint of improving storage stability. The acid may be added to the aqueous phase before contact of the oil phase with the aqueous phase or may be added after contact of the oil phase with the aqueous phase.

In addition, the aqueous phase of the liquid seasoning may contain, for example: water; a vinegar, such as a rice vinegar, a sake lees vinegar, an apple vinegar, a grape vinegar, a grain vinegar, or a synthetic vinegar; a salt, such as dietary salt; a seasoning, such as sodium glutamate; a saccharide, such as sugar or starch syrup; a taste substance, such as sake, sweet cooking rice wine, or soy sauce; various vitamins; an organic acid, such as citric acid and a salt thereof; a spice; squeezed juices of various vegetables or fruits, such as lemon juice; various vegetables; various fruits; a polysaccharide thickener, such as xanthan gum, gellan gum, guar gum, tamarind gum, carrageenan, pectin, or tragacanth gum; a starch, such as potato starch, a degraded product thereof, and a starch obtained as a chemically modified product thereof; a synthetic emulsifier such a sucrose fatty acid ester, a sorbitan fatty acid ester, or a polysorbate; a natural emulsifier, such as lecithin or an enzymatically degraded product thereof; a dairy product, such as milk; a protein-based emulsifier, such as a protein, such as soybean protein, milk protein, or wheat protein, or a separated or degraded product of the protein; or various phosphates. In the present invention, those substances may be appropriately blended depending on, for example, the viscosity or physical properties of a composition of interest.

The blending ratio (mass ratio) of the oil phase and the aqueous phase in the liquid seasoning is preferably from 10/90 to 80/20, more preferably from 20/80 to 75/25.

The liquid seasoning produced as described above may be filled into a container and used as a packaged food.

The container may be any of containers that are typically used for liquid seasonings. Of those, a flexible container that is more easy-to-use as compared to a bottle, such as a plastic tube-type container, is preferred. As materials for the plastic container, there are given, for example, thermoplastic plastics, such as polyethylene, polypropylene, ethylene vinyl acetate, an ethylene/vinyl alcohol copolymer, and polyethylene terephthalate, and the container may be produced, for example, by blow molding of a mixture of one or two or more of the above-mentioned thermoplastic plastics or by blow molding of a laminate including two or more layers each made of any of the above-mentioned thermoplastic plastics.

The liquid seasoning in the present invention is a seasoning obtained by bringing an oil phase containing a fat or oil into contact with an aqueous phase containing water, and examples thereof include a separate-type seasoning comprising an oil phase as an upper layer and an aqueous phase as a lower layer, an emulsion-type seasoning comprising an oil-in-water emulsion, and a separate-type seasoning obtained by laminating an oil phase on the oil-in-water emulsion.

Specifically, examples of the liquid seasoning include dressings defined in Japanese Agricultural Standard (JAS), such as a semisolid dressing, an emulsion dressing, a separate-type liquid dressing, a mayonnaise, and a salad creamy dressing. The liquid seasoning is not particularly limited thereto and encompasses various products called mayonnaises, mayonnaise-like foods, dressings, and dressing-like foods.

The present invention further discloses the following liquid seasoning or method of producing a liquid seasoning regarding the embodiments described above.

<1> A method of producing a liquid seasoning, comprising the following steps (1), (2), and (3):

(1) at a temperature of 80° C. or less, adding an aqueous solution of at least one selected from the group consisting of ascorbic acid, hydroxy acid, and salts thereof to a fat or oil and stirring the mixture;

(2) bringing the fat or oil after the step (1) into contact with water vapor under reduced pressure; and (3) bringing the fat or oil obtained in the step (2) as an oil phase component into contact with an aqueous phase.

<2> The method of producing a liquid seasoning according to the above-mentioned item <1>, wherein the fat or oil in the step (1) is preferably one or two or more selected from the group consisting of soybean oil, rapeseed oil, safflower oil, corn oil, sunflower oil, cotton seed oil, olive oil, sesame oil, peanut oil, Job's tears oil, wheat germ oil, Japanese basil oil, linseed oil, perilla oil, algae oil, and fish oil, more preferably a mixed oil of one or two or more selected from the group consisting of linseed oil, perilla oil, algae oil, and fish oil, and one or two kinds selected from the group consisting of soybean oil, rapeseed oil, safflower oil, corn oil, sunflower oil, cotton seed oil, olive oil, and sesame oil, more preferably a mixed oil of one or two or more selected from the group consisting of linseed oil, algae oil, and fish oil, and one or two kinds selected from the group consisting of soybean oil, rapeseed oil, sunflower oil, olive oil, and sesame oil, even more preferably a mixed oil of linseed oil and rapeseed oil, or a mixed oil of fish oil and rapeseed oil.

<3> The method of producing a liquid seasoning according to the above-mentioned item <1> or <2>, wherein the content of linseed oil and/or perilla oil in the fat or oil in the step (1) is preferably 5 mass % or more, more preferably 10 mass % or more, even more preferably 15 mass % or more, is preferably 90 mass % or less, more preferably 80 mass % or less, even more preferably 70 mass % or less, and is preferably from 5 mass % to 90 mass %, more preferably from 10 mass % to 80 mass %, even more preferably from 15 mass % to 70 mass %.

<4> The method of producing a liquid seasoning according to any one of the above-mentioned items <1> to <3>, wherein the content of one or two or more of fat or oil selected from the group consisting of fish oil and algae oil in the fat or oil in the step (1) is preferably 1 mass % or more, more preferably 2 mass % or more, more preferably 3 mass % or more, even more preferably 5 mass % or more, is preferably 100 mass % or less, more preferably 80 mass % or less, more preferably 50 mass % or less, even more preferably 25 mass % or less, and is preferably from 1 mass % to 100 mass %, more preferably from 2 mass % to 80 mass %, more preferably from 3 mass % to 50 mass %, even more preferably from 5 mass % to 25 mass %.

<5> The method of producing a liquid seasoning according to any one of the above-mentioned items <1> to <4>, wherein the temperature in the step (1) is preferably 75° C. or less, more preferably 70° C. or less, is preferably 15° C. or more, more preferably 20° C. or more, even more preferably 40° C. or more, and is preferably from 15° C. to 80° C., more preferably from 20° C. to 75° C., even more preferably from 40° C. to 70° C.

<6> The method of producing a liquid seasoning according to any one of the above-mentioned items <1> to <5>, wherein the hydroxy acid is preferably lactic acid, tartaric acid, malic acid, or citric acid, more preferably citric acid or tartaric acid.

<7> The method of producing a liquid seasoning according to any one of the above-mentioned items <1> to <6>, wherein, when a water washing step is carried out after the step (1), the concentration of the aqueous solution of ascorbic acid, hydroxy acid, or a salt thereof is preferably 0.1 mass % or more, more preferably 0.2 mass % or more, is preferably 20 mass % or less, more preferably 10 mass % or less, more preferably 5 mass % or less, even more preferably 2 mass % or less, and is preferably from 0.1 mass % to 20 mass %, more preferably from 0.2 mass % to 10 mass %, more preferably from 0.2 mass % to 5 mass %, even more preferably from 0.2 mass % to 2 mass %.

<8> The method of producing a liquid seasoning according to any one of the above-mentioned items <1> to <7>, wherein, when a water washing step is carried out after the step (1), the addition amount of the aqueous solution of ascorbic acid, hydroxy acid, or a salt thereof is preferably 10 mass % or more, more preferably 20 mass % or more, even more preferably 30 mass % or more, with respect to the fat or oil, is preferably 100 mass % or less, more preferably 80 mass % or less, even more preferably 60 mass % or less, with respect to the fat or oil, and is preferably from 10 mass % to 100 mass %, more preferably from 20 mass % to 80 mass %, even more preferably from 30 mass % to 60 mass %, with respect to the fat or oil.

<9> The method of producing a liquid seasoning according to any one of the above-mentioned items <1> to <6>, wherein, when a water washing step is not carried out after the step (1), the concentration of the aqueous solution of ascorbic acid, hydroxy acid, or a salt thereof is preferably 0.00001 mass % or more, more preferably 0.00002 mass % or more, more preferably 0.00005 mass % or more, even more preferably 0.0001 mass % or more, is preferably 1 mass % or less, more preferably 0.5 mass % or less, more preferably 0.2 mass % or less, more preferably 0.1 mass % or less, more preferably 0.01 mass % or less, more preferably 0.001 mass % or less, even more preferably 0.0003 mass % or less, and is preferably from 0.00001 mass % to 1 mass %, more preferably from 0.00002 mass % to 0.5 mass %, more preferably from 0.00005 mass % to 0.2 mass %, more preferably from 0.0001 mass % to 0.1 mass %, more preferably from 0.0001 mass % to 0.01 mass %, more preferably from 0.0001 mass % to 0.001 mass %, even more preferably from 0.0001 mass % to 0.0003 mass %.

<10> The method of producing a liquid seasoning according to any one of the above-mentioned items <1> to <6> and <9>, wherein, when a water washing step is not carried out after the step (1), the addition amount of the aqueous solution of ascorbic acid, hydroxy acid, or a salt thereof is preferably 1 mass % or more, more preferably 2 mass % or more, even more preferably 3 mass % or more, with respect to the fat or oil, is preferably 10 mass % or less, more preferably 8 mass % or less, even more preferably 6 mass % or less, with respect to the fat or oil, and is preferably from 1 mass % to 10 mass %, more preferably from 2 mass % to 8 mass %, even more preferably from 3 mass % to 6 mass %, with respect to the fat or oil.

<11> The method of producing a liquid seasoning according to any one of the above-mentioned items <1> to <10>, wherein the temperature at which the fat or oil is brought into contact with water vapor is preferably 70° C. or more, more preferably 100° C. or more, more preferably 130° C. or more, more preferably 150° C. or more, even more preferably 160° C. or more, is preferably 200° C. or less, more preferably 190° C. or less, even more preferably 180° C. or less, and is preferably from 70° C. to 200° C., more preferably from 100° C. to 190° C., more preferably from 130° C. to 180° C., more preferably from 150° C. to 180° C., even more preferably from 160° C. to 180° C.

<12> The method of producing a liquid seasoning according to any one of the above-mentioned items <1> to <11>, wherein the period of time for contact of the fat or oil with water vapor is preferably 0.5 minute or more, more preferably 5 minutes or more, more preferably 10 minutes or more, even more preferably 20 minutes or more, is preferably 90 minutes or less, more preferably 60 minutes or less, more preferably 50 minutes or less, even more preferably 40 minutes or less, and is preferably from 0.5 minute to 90 minutes, more preferably from 5 minutes to 60 minutes, more preferably from 10 minutes to 50 minutes, even more preferably from 20 minutes to 40 minutes.

<13> The method of producing a liquid seasoning according to any one of the above-mentioned items <1> to <12>, further comprising, after the step (1), a water washing step of bringing the fat or oil into contact with water, to there by perform oil-water separation.

<14> The method of producing a liquid seasoning according to the above-mentioned item <13>, wherein the usage amount of the water is preferably 1 mass % or more, more preferably 3 mass % or more, even more preferably 5 mass % or more, is preferably 50 mass % or less, more preferably 30 mass % or less, even more preferably 20 mass % or less, and is preferably from 1 mass % to 50 mass %, more preferably from 3 mass % to 30 mass %, even more preferably from 5 mass % to 20 mass %, with respect to the fat or oil.

<15> The method of producing a liquid seasoning according to any one of the above-mentioned items <1> to <14>, wherein the blending ratio (mass ratio) of the oil phase and the aqueous phase in the liquid seasoning is preferably from 10/90 to 80/20, more preferably from 20/80 to 75/25.

<16> The method of producing a liquid seasoning according to any one of the above-mentioned items <1> to <15>, wherein the liquid seasoning is preferably a separate-type liquid seasoning comprising an oil phase as an upper layer and an aqueous phase as a lower layer, an emulsion-type liquid seasoning comprising an oil-in-water emulsion, or a separate-type liquid seasoning obtained by laminating an oil phase on the oil-in-water emulsion, more preferably a semi-solid dressing, an emulsion dressing, a mayonnaise, or a salad creamy dressing, even more preferably an emulsion dressing or a mayonnaise.

<17> A liquid seasoning, comprising: an oil phase that contains a fat or oil obtained by a method comprising the following steps (1) and (2); and an aqueous phase:
(1) at a temperature of 80° C. or less, adding an aqueous solution of at least one selected from the group consisting of ascorbic acid, hydroxy acid, and salts thereof to a fat or oil and stirring the mixture; and
(2) bringing the fat or oil after the step (1) into contact with water vapor under reduced pressure.

<18> A method of producing a liquid seasoning, comprising the following steps (4), (5), and (6):
(4) adding an aqueous solution of at least one selected from the group consisting of ascorbic acid, hydroxy acid, and salts thereof to a fat or oil, and subjecting the mixture to bubbling with an inert gas and stirring;
(5) bringing the fat or oil after the step (4) into contact with water vapor under reduced pressure; and
(6) bringing the fat or oil obtained in the step (5) as an oil phase component into contact with an aqueous phase.

<19> The method of producing a liquid seasoning according to the above-mentioned item <18>, wherein the fat or oil in the step (4) is preferably one or two or more selected from the group consisting of soybean oil, rapeseed oil, safflower oil, corn oil, sunflower oil, cotton seed oil, olive oil, sesame oil, peanut oil, Job's tears oil, wheat germ oil, Japanese basil oil, linseed oil, perilla oil, algae oil, and fish oil, more preferably one or two or more selected from the group consisting of linseed oil, perilla oil, algae oil, and fish oil, even more preferably fish oil.

<20> The method of producing a liquid seasoning according to the above-mentioned item <18> or <19>, wherein the content of fish oil in the fat or oil in the step (4) is preferably 75 mass % or more, more preferably 85 mass % or more, even more preferably 95 mass % or more.

<21> The method of producing a liquid seasoning according to any one of the above-mentioned items <18> to <20>, wherein the temperature in the step (4) is preferably 80° C. or less, more preferably 75° C. or less, even more preferably 70° C. or less, is preferably 15° C. or more, more preferably 20° C. or more, and is preferably from 15° C. to 80° C., more preferably from 15° C. to 75° C., even more preferably from 20° C. to 70° C.

<22> The method of producing a liquid seasoning according to any one of the above-mentioned items <18> to <21>, wherein the hydroxy acid is preferably lactic acid, tartaric acid, malic acid, or citric acid, more preferably citric acid or tartaric acid, even more preferably citric acid.

<23> The method of producing a liquid seasoning according to any one of the above-mentioned items <18> to <22>, wherein, when a water washing step is carried out after the step (4), the concentration of the aqueous solution of ascorbic acid, hydroxy acid, or a salt thereof is preferably 0.1 mass % or more, more preferably 0.2 mass % or more, more preferably 0.5 mass % or more, even more preferably 1 mass % or more, is preferably 20 mass % or less, more preferably 10 mass % or less, more preferably 5 mass % or less, even more preferably 3 mass % or less, and is preferably from 0.1 mass % to 20 mass %, more preferably from 0.2 mass % to 10 mass %, more preferably from 0.5 mass % to 5 mass %, even more preferably from 1 mass % to 3 mass %.

<24> The method of producing a liquid seasoning according to any one of the above-mentioned items <18> to <23>, wherein, when a water washing step is carried out after the step (4), the addition amount of the aqueous solution of ascorbic acid, hydroxy acid, or a salt thereof is preferably 10 mass % or more, more preferably 20 mass % or more, even more preferably 30 mass % or more, with respect to the fat or oil, is preferably 100 mass % or less, more preferably 80 mass % or less, even more preferably 60 mass % or less, with respect to the fat or oil, and is preferably from 10 mass % to 100 mass %, more preferably from 20 mass % to 80 mass %, even more preferably from 30 mass % to 60 mass %, with respect to the fat or oil.

<25> The method of producing a liquid seasoning according to any one of the above-mentioned items <18> to <22>, wherein, when a water washing step is not carried out after the step (4), the concentration of the aqueous solution of ascorbic acid, hydroxy acid, or a salt thereof is preferably 0.00001 mass % or more, more preferably 0.0001 mass % or more, is preferably 1 mass % or less, more preferably 0.5 mass % or less, more preferably 0.2 mass % or less, more preferably 0.1 mass % or less, more preferably 0.01 mass % or less, even more preferably 0.001 mass % or less, and is preferably from 0.00001 mass % to 1 mass %, more preferably from 0.0001 mass % to 0.5 mass %, more preferably from 0.0001 mass % to 0.2 mass %, more preferably from 0.0001 mass % to 0.1 mass %, more preferably from 0.0001 mass % to 0.01 mass %, even more preferably from 0.0001 mass % to 0.001 mass %.

<26> The method of producing a liquid seasoning according to any one of the above-mentioned items <18> to <22> and <25>, wherein, when a water washing step is not carried out after the step (4), the addition amount of the aqueous solution of ascorbic acid, hydroxy acid, or a salt thereof is preferably 1 mass % or more, more preferably 2 mass % or more, even more preferably 3 mass % or more, with respect to the fat or oil, is preferably 10 mass % or less, more preferably 8 mass % or less, even more preferably 6 mass % or less, with respect to the fat or oil, and is preferably from 1 mass % to 10 mass %, more preferably from 2 mass % to 8 mass %, even more preferably from 3 mass % to 6 mass %, with respect to the fat or oil.

<27> The method of producing a liquid seasoning according to any one of the above-mentioned items <18> to <26>, wherein the inert gas is preferably argon gas or nitrogen gas, more preferably nitrogen gas.

<28> The method of producing a liquid seasoning according to any one of the above-mentioned items <18> to <27>, wherein the flow rate of the inert gas is preferably 0.1 L/hr or more, more preferably 0.2 L/hr or more, more preferably 0.5 L/hr or more, even more preferably 2 L/hr or more, with respect to 1 kg of the fat or oil, is preferably 50 L/hr or less, more preferably 40 L/hr or less, even more preferably 30 L/hr or less, with respect to 1 kg of the fat or oil, and is preferably from 0.1 L/hr to 50 L/hr, more preferably from 0.2 L/hr to 40 L/hr, more preferably from 0.5 L/hr to 30 L/hr, even more preferably from 2 L/hr to 30 L/hr, with respect to 1 kg of the fat or oil.

<29> The method of producing a liquid seasoning according to any one of the above-mentioned items <18> to <28>, wherein the period of time for bubbling and stirring is preferably from 10 minutes to 5 hours, more preferably from 1 hour to 3 hours.

<30> The method of producing a liquid seasoning according to any one of the above-mentioned items <18> to <29>, wherein the temperature at which the fat or oil is brought into contact with water vapor is preferably 70° C. or more, more preferably 100° C. or more, more preferably 130° C. or more, even more preferably 150° C. or more, is preferably 230° C. or less, more preferably 210° C. or less, even more preferably 190° C. or less, and is preferably from 70° C. to 230° C., more preferably from 100° C. to 210° C., more preferably from 130° C. to 190° C., even more preferably from 150° C. to 190° C.

<31> The method of producing a liquid seasoning according to any one of the above-mentioned items <18> to <30>, wherein the period of time for contact of the fat or oil with water vapor is preferably 1 minute or more, more preferably 10 minutes or more, more preferably 20 minutes or more, even more preferably 30 minutes or more, is preferably 300 minutes or less, more preferably 240 minutes or less, even more preferably 180 minutes or less, and is preferably from 1 minute to 300 minutes, more preferably from 10 minutes to 240 minutes, more preferably from 20 minutes to 180 minutes, even more preferably from 30 minutes to 180 minutes.

<32> The method of producing a liquid seasoning according to anyone of the above-mentioned items <18> to <31>, further comprising, after the step (4), a water washing step of bringing the fat or oil into contact with water, to thereby perform oil-water separation.

<33> The method of producing a liquid seasoning according to the above-mentioned item <32>, wherein the usage amount of the water is preferably 1 mass % or more, more preferably 3 mass % or more, even more preferably 5 mass % or more, with respect to the fat or oil, is preferably 100 mass % or less, more preferably 90 mass % or less, even more preferably 80 mass % or less, with respect to the fat or oil, and is preferably from 1 mass % to 100 mass %, more preferably from 3 mass % to 90 mass %, even more preferably from 5 mass % to 80 mass %, with respect to the fat or oil.

<34> The method of producing a liquid seasoning according to the above-mentioned item <32> or <33>, further comprising a step of subjecting the water to deoxygenation treatment prior to contact with the fat or oil.

<35> The method of producing a liquid seasoning according to any one of the above-mentioned items <18> to <34>, further comprising a step of subjecting the fat or oil to be subjected to the step (4) to deoxygenation treatment.

<36> The method of producing a liquid seasoning according to any one of the above-mentioned items <18> to <35>, wherein the ratio of the fat or oil obtained in the step (2) in the oil phase of the liquid seasoning is preferably from 1 mass % to 100 mass %, more preferably from 3 mass % to 60 mass %, even more preferably from 5 mass % to 20 mass %.

<37> The method of producing a liquid seasoning according to anyone of the above-mentioned items <18> to <36>, wherein the blending ratio (mass ratio) of the oil phase and the aqueous phase in the liquid seasoning is preferably from 10/90 to 80/20, more preferably from 20/80 to 75/25.

<38> The method of producing a liquid seasoning according to any one of the above-mentioned items <18> to <37>, wherein the liquid seasoning is preferably a separate-type liquid seasoning comprising an oil phase as an upper layer and an aqueous phase as a lower layer, an emulsion-type liquid seasoning comprising an oil-in-water emulsion, or a separate-type liquid seasoning obtained by laminating an oil phase on the oil-in-water emulsion, more preferably a semi-solid dressing, an emulsion dressing, a mayonnaise, or a salad creamy dressing, even more preferably an emulsion dressing or a mayonnaise.

<39> A liquid seasoning, comprising: an oil phase that contains a fat or oil obtained by a method comprising the following steps (4) and (5); and an aqueous phase:

(4) adding an aqueous solution of at least one selected from the group consisting of ascorbic acid, hydroxyacid, and salts thereof to a fat or oil, and subjecting the mixture to bubbling with an inert gas and stirring; and (5) bringing the fat or oil after the step (4) into contact with water vapor under reduced pressure.

Example

Measurement of Dissolved Oxygen Concentration

The dissolved oxygen concentration in a fat or oil or water was measured using a portable dissolved oxygen meter (sevenGo pro, manufactured by Mettler Toledo).

Examples 1 to 5 and Comparative Examples 1 and 2

Preparation of Oil Phase

An aqueous solution of any of organic acids (salts) shown in the condition (1) in Table 1 was added to a fat or oil obtained by mixing, at a ratio of 9:1, 450 g of rapeseed oil (Nisshin rapeseed salad oil: manufactured by The Nisshin OilliO Group, Ltd., unsaturated fatty acid content: 93.4%, the same applies hereinafter) and 50 g of fish oil (DHA-27: manufactured by Nippon Suisan Kaisha, Ltd., total content of DHA and EPA in fatty acids: 40%, unsaturated fatty acid content: 73.7%, the same applies hereinafter) at 50% relative to the fat or oil, and the resultant was heated to 70° C. and stirred under a nitrogen stream at 500 r/min for 4 hours. After that, the mixture was centrifuged (centrifuge machine: manufactured by Hitachi, Ltd., 40° C.) at 6,000 r/min for 10 minutes, and the aqueous phase was removed. Thus, a fat or oil was obtained.

Subsequently, water was added at 10% relative to the fat or oil, and the resultant was heated to 70° C. and stirred at 500 r/min for 20 minutes. After that, the mixture was centrifuged at 6,000 r/min for 10 minutes. The water washing procedure was repeated three times.

The fat or oil was taken out of the centrifuge tube, and subjected to dehydration treatment with stirring under conditions of 70° C. and 0.1 kPa.

The fat or oil was loaded into a 2 L glass Claisen flask and subjected to contact treatment with water vapor under the following conditions for 30 minutes: temperature: 150° C., pressure: 0.4 kPa, amount of water vapor: 2% relative to oil/h. Thus, an oil phase was obtained.

[Preparation of Liquid Seasoning]

Raw materials for an aqueous phase shown in Table 2, excluding egg yolk, were mixed and sterilized by heating at 80° C. for 4 minutes, and the mixture was cooled to ordinary temperature. 67 Parts by mass of the oil phase obtained above was added to 33 parts by mass of the aqueous phase supplemented with egg yolk, followed by preliminary emulsification, and the resultant was homogenized with a colloid mill (3,000 r/min, clearance: 0.08 mm), to thereby produce a mayonnaise having an average particle diameter of from 2.0 μm to 3.5 μm. The resultant mayonnaise was filled into a 100 g plastic tube-type container, and used as a sample.

Examples 6 to 9

Preparation of Oil Phase

In the same manner as in Example 1, an aqueous solution of any of organic acids (salts) shown in the condition (1) in Table 1 was added at 5% relative to the fat or oil, and the mixture was stirred, followed by removal of the aqueous phase. Thus, a fat or oil was obtained.

The fat or oil was taken out of the centrifuge tube, and subjected to dehydration treatment with stirring under conditions of 70° C. and 0.1 kPa.

Subsequently, the fat or oil after dehydration was subjected to contact treatment with water vapor in the same manner as in Example 1 under the condition (2) shown in Table 1. Thus, a fat or oil was obtained and used as an oil phase component.

[Preparation of Liquid Seasoning]

A mayonnaise having a ratio shown in Table 2 was produced in the same manner as in Example 1 using the oil phase obtained above, and used as a sample.

Examples 10 and 11

Preparation of Oil Phase

In the same manner as in Example 1, an aqueous solution of any of organic acids (salts) shown in the condition (1) in Table 1 was added at 50% relative to the fat or oil, and the mixture was heated to 70° C. and stirred, followed by removal of the aqueous phase. Thus, a fat or oil was obtained.

Subsequently, in the same manner as in Example 1, water was added at 10% relative to the fat or oil, and the resultant was heated to 70° C. and stirred at 500 r/min for 20 minutes. After that, the mixture was centrifuged at 6,000 r/min for 10 minutes. The water washing procedure was repeated three times.

The fat or oil was taken out of the centrifuge tube and subjected to dehydration treatment with stirring under conditions of 70° C. and 0.1 kPa.

The fat or oil after dehydration was loaded into a 2 L glass Claisen flask, and subjected to contact treatment with water vapor under the following conditions for 30 minutes or 60 minutes: temperature: 180° C., pressure: 0.4 kPa, amount of water vapor: 2% relative to oil/h. Thus, an oil phase was obtained.

[Preparation of Liquid Seasoning]

A mayonnaise having a ratio shown in Table 2 was produced in the same manner as in Example 1 using the oil phase obtained above, and used as a sample.

Comparative Example 3

Preparation of Oil Phase

Water was added to a fat or oil obtained by mixing, at a ratio of 9:1, 450 g of rapeseed oil (Nisshin rapeseed salad oil: manufactured by The Nisshin OilliO Group, Ltd.) and 50 g of fish oil (DHA-27: manufactured by Nippon Suisan Kaisha, Ltd.) at 10% relative to the fat or oil, and the resultant was heated to 70° C. and stirred at 500 r/min for 20 minutes. After that, the mixture was centrifuged at 6,000 r/min for 10 minutes. This water washing procedure was repeated three times.

The fat or oil was taken out of the centrifuge tube, and subjected to dehydration treatment with stirring under conditions of 70° C. and 0.1 kPa.

Subsequently, the fat or oil after dehydration was subjected to contact treatment with water vapor in the same manner as in Example 1 under the condition (2) shown in Table 1. Thus, an oil phase was obtained.

[Preparation of Liquid Seasoning]

A mayonnaise having a ratio shown in Table 2 was produced in the same manner as in Example 1 using the oil phase obtained above, and used as a sample.

Comparative Example 4

Preparation of Oil Phase

In the same manner as in Example 1, an aqueous solution of 0.2% sodium L-ascorbate was added at 50% relative to the fat or oil under the condition (1) shown in Table 1, and the mixture was stirred, followed by removal of the aqueous phase. Thus, a fat or oil was obtained.

Subsequently, in the same manner as in Example 1, water was added at 10% relative to the fat or oil, and the resultant was heated to 70° C. and stirred at 500 r/min for 20 minutes. After that, the mixture was centrifuged at 6,000 r/min for 10 minutes. The water washing procedure was repeated three times.

The fat or oil was taken out of the centrifuge tube, and subjected to dehydration treatment with stirring under conditions of 70° C. and 0.1 kPa.

[Preparation of Liquid Seasoning]

A mayonnaise having a ratio shown in Table 2 was produced in the same manner as in Example 1 using the fat or oil after dehydration obtained above as an oil phase, and used as a sample.

Comparative Example 5

Preparation of Oil Phase and Liquid Seasoning

A mayonnaise having a ratio shown in Table 2 was produced in the same manner as in Example 1 using, as an oil phase, a fat or oil obtained by mixing, at a ratio of 9:1, 450 g of rapeseed oil (Nisshin rapeseed salad oil: manufactured by The Nisshin OilliO Group, Ltd.) and 50 g of fish oil (DHA-27: manufactured by Nippon Suisan Kaisha, Ltd.), and used as a sample.

Comparative Example 6

Preparation of Oil Phase

An fat or oil obtained by mixing, at a ratio of 9:1, 450 g of rapeseed oil (Nisshin rapeseed salad oil: manufactured by The Nisshin OilliO Group, Ltd.) and 50 g of fish oil (DHA-27: manufactured by Nippon Suisan Kaisha, Ltd.) was loaded into a 1 L glass Claisen flask, and the resultant was subjected to contact treatment with water vapor under the following conditions for 30 minutes: temperature: 150° C., pressure: 0.4 kPa, amount of water vapor: 2% relative to the oil/h and then cooled to 120° C., followed by release of the pressure once. 100 µL of an aqueous solution of 0.5% sodium L-ascorbate was added to the fat or oil, and the resultant was depressurized again and then cooled to 50° C. Thus, an oil phase was obtained.

[Preparation of Liquid Seasoning]

A mayonnaise having a ratio shown in Table 2 was produced in the same manner as in Example 1 using the oil phase obtained above, and used as a sample.

[Evaluation of Taste and Flavor]

(1) Fishy Odor

The samples were separately stored with no exposure to light at 40° C. for 2 weeks or with exposure to light at 20° C. for 2 weeks and then left to stand for about 4 hours at room temperature, and two expert panelists evaluated their taste and flavor (fishy odor) in accordance with the following criteria. After that, discussion was made to determine the final scores. The results are shown in Table 1.

5: No fishy odor is sensed.
4: Fishy odor is hardly sensed.
3: Fishy odor is slightly sensed.
2: Fishy odor is sensed.
1: Fishy odor is strongly sensed.

TABLE 1

| | | | Example 1 | Example 2 | Example 3 | Example 4 | Example 5 | Example 6 |
|---|---|---|---|---|---|---|---|---|
| Condition (1) | Kind of acid | — | L-Ascorbic acid | Sodium L-ascorbate | Sodium L-ascorbate | Sodium L-ascorbate | Citric acid | Sodium L-ascorbate |
| | Concentration | [mass %] | 0.2% | 0.2% | 1.0% | 10.0% | 0.2% | 0.0001% |
| | Addition amount of aqueous solution | [%-Relative to oil] | 50% | 50% | 50% | 50% | 50% | 5% |
| | Temperature | [° C.] | 70 | 70 | 70 | 70 | 70 | 70 |
| | Time | [min] | 240 | 240 | 240 | 240 | 240 | 240 |
| Water washing conditions | Temperature | [° C.] | 70 | 70 | 70 | 70 | 70 | None |
| | Time | [min] | 20 | 20 | 20 | 20 | 20 | |
| | Addition amount of water | [%-Relative to oil] | 10% | 10% | 10% | 10% | 10% | |
| Condition (2) | Temperature | [° C.] | 150 | 150 | 150 | 150 | 150 | 150 |
| | Time | [min] | 30 | 30 | 30 | 30 | 30 | 30 |
| | Gauge | [kPa] | 0.4 | 0.4 | 0.4 | 0.4 | 0.4 | 0.4 |

TABLE 1-continued

|  |  |  | Example 7 | Example 8 | Example 9 | Example 10 | Example 11 | Comparative Example 1 |
|---|---|---|---|---|---|---|---|---|
|  | pressure |  |  |  |  |  |  |  |
|  | Amount of water vapor | [%-Relative to oil/hr] | 2% | 2% | 2% | 2% | 2% | 2% |
| Evaluation | 40° C., 2 weeks |  | 4.5 | 4.5 | 4 | 4 | 4 | 4.5 |
|  | Exposure to light, 2 weeks |  | 4 | 4 | 4.5 | 4.5 | 4 | 4.5 |

|  |  |  | Example 7 | Example 8 | Example 9 | Example 10 | Example 11 | Comparative Example 1 |
|---|---|---|---|---|---|---|---|---|
| Condition (1) | Kind of acid | — | Sodium L-ascorbate | Tartaric acid | Erythorbic acid | Sodium L-ascorbate | Sodium L-ascorbate | Phosphoric acid |
|  | Concentration | [mass %] | 0.001% | 0.0001% | 0.0001% | 0.2% | 0.2% | 0.2% |
|  | Addition amount of aqueous solution | [%-Relative to oil] | 5% | 5% | 5% | 50% | 50% | 50% |
|  | Temperature | [° C.] | 70 | 70 | 70 | 70 | 70 | 70 |
|  | Time | [min] | 240 | 240 | 240 | 240 | 240 | 240 |
| Water washing conditions | Temperature | [° C.] | None | None | None | 70 | 70 | 70 |
|  | Time | [min] |  |  |  | 20 | 20 | 20 |
|  | Addition amount of water | [%-Relative to oil] |  |  |  | 10% | 10% | 10% |
| Condition (2) | Temperature | [° C.] | 150 | 150 | 150 | 180 | 180 | 150 |
|  | Time | [min] | 30 | 30 | 30 | 30 | 60 | 30 |
|  | Gauge pressure | [kPa] | 0.4 | 0.4 | 0.4 | 0.4 | 0.4 | 0.4 |
|  | Amount of water vapor | [%-Relative to oil/hr] | 2% | 2% | 2% | 2% | 2% | 2% |
| Evaluation | 40° C., 2 weeks |  | 4 | 4 | 4.5 | 4.5 | 4.5 | 3 |
|  | Exposure to light, 2 weeks |  | 4 | 4 | 4 | 4 | 4.5 | 3.5 |

|  |  |  | Comparative Example 2 | Comparative Example 3 | Comparative Example 4 | Comparative Example 5 | Comparative Example 6 |
|---|---|---|---|---|---|---|---|
| Condition (1) | Kind of acid | — | Sodium nitrite | None | Sodium L-ascorbate | None | None |
|  | Concentration | [mass %] | 0.2% |  | 0.2% |  |  |
|  | Addition amount of aqueous solution | [%-Relative to oil] | 50% |  | 50% |  |  |
|  | Temperature | [° C.] | 70 |  | 70 |  |  |
|  | Time | [min] | 240 |  | 240 |  |  |
| Water washing conditions | Temperature | [° C.] | 70 | 70 | 70 | None | None |
|  | Time | [min] | 20 | 20 | 20 |  |  |
|  | Addition amount of water | [%-Relative to oil] | 10% | 10% | 10% |  |  |
| Condition (2) | Temperature | [° C.] | 150 | 150 | None | None | 150 |
|  | Time | [min] | 30 | 30 |  |  | 30 |
|  | Gauge pressure | [kPa] | 0.4 | 0.4 |  |  | 0.4 |
|  | Amount of water vapor | [%-Relative to oil/hr] | 2% | 2% |  |  | 2% |
| Evaluation | 40° C., 2 weeks |  | 3 | 4.5 | 4 | 1 | 4 |
|  | Exposure to light, 2 weeks |  | 3.5 | 2 | 3 | 1 | 3.5 |

TABLE 2

| | | (mass %) |
|---|---|---|
| Aqueous phase | Egg yolk supplemented with 10% salt | 15 |
| | Vinegar | 6.7 |
| | Superfine sugar | 1 |
| | Dietary salt | 0.6 |
| | Sodium glutamate | 0.4 |
| | Mustard powder | 0.3 |
| | Water | Balance |
| Oil phase | | 67 |
| Total | | 100 | the fat or oil of Comparative Examples 3 and 5, which was found to be degraded in their taste and flavor.

(2) Sourness

The samples obtained in Examples 2, 6, 10, and 11 were stored with no exposure to light at 40° C. for 2 weeks and then left to stand for about 4 hours at room temperature, and two expert panelists evaluated the degrees of sourness thereof in accordance with the following criteria. After that, discussion was made to determine the final scores. The results are shown in Table 3.

3: Having sourness and good taste and flavor.

2: Having mildly strong sourness and mildly good taste and flavor.

1: Having strong sourness and bad taste and flavor.

TABLE 3

| | | | Example 2 | Example 6 | Example 10 | Example 11 |
|---|---|---|---|---|---|---|
| Condition (1) | Kind of acid | — | Sodium L-ascorbate | Sodium L-ascorbate | Sodium L-ascorbate | Sodium L-ascorbate |
| | Concentration | [mass %] | 0.2% | 0.0001% | 0.2% | 0.2% |
| | Addition amount of aqueous solution | [%-Relative to oil] | 50% | 5% | 50% | 50% |
| | Temperature | [° C.] | 70 | 70 | 70 | 70 |
| | Time | [min] | 240 | 240 | 240 | 240 |
| Water washing conditions | Temperature | [° C.] | 70 | None | 70 | 70 |
| | Time | [min] | 20 | | 20 | 20 |
| | Addition amount of water | [%-Relative to oil] | 10% | | 10% | 10% |
| Condition (2) | Temperature | [° C.] | 150 | 150 | 180 | 180 |
| | Time | [min] | 30 | 30 | 30 | 60 |
| | Gauge pressure | [kPa] | 0.4 | 0.4 | 0.4 | 0.4 |
| | Amount of water vapor | [%-Relative to oil/hr] | 2% | 2% | 2% | 2% |
| Evaluation | Degree of sourness | | 3 | 2 | 3 | 3 |

As is apparent from Table 1, the acidic oil-in-water emulsified composition prepared by a conventional method was significantly degraded in taste and flavor with time and had a strong fishy odor (Comparative Example 5). Meanwhile, it found that, in the acidic oil-in-water emulsified compositions prepared by the method of the present invention, time-dependent degradation of the taste and flavor was suppressed.

In the cases of the samples of Comparative Examples 1 and 2 each prepared using the aqueous solution of phosphoric acid or sodium nitrite, the sample of Comparative Example 3 having been subjected to only washing with water and treatment to bring the fat or oil into contact with water vapor, the sample of Comparative Example 4 having not been subjected to treatment to bring the fat or oil into contact with water vapor, and the sample of Comparative Example 6 to which an aqueous solution of sodium L-ascorbate was added at the time of high temperature in treatment to bring the fat or oil into contact with water vapor, their taste and flavor were not retained sufficiently during storage.

Meanwhile, the fat or oil prepared in Examples and Comparative Examples were stored and then evaluated on their taste and flavor in the same manner as in the above-mentioned section [Evaluation of Taste and Flavor]. As a result, the fat or oil retained good taste and flavor except for As is apparent from Table 3, the mayonnaises of Examples 2, 10, and 11 had adequate sourness as compared to the mayonnaise of Example 6, and are more preferred.

Example 12

Preparation of Oil Phase

An aqueous solution of 0.2% sodium L-ascorbate shown in the condition (1) in Table 4 was added to 500 g of rapeseed oil (Nisshin rapeseed salad oil: manufactured by The Nisshin OilliO Group, Ltd.) at 50% relative to the fat or oil, and the resultant was heated to 70° C. and stirred under a nitrogen stream at 500 r/min for 4 hours. After that, the mixture was centrifuged (centrifuge machine: manufactured by Hitachi, Ltd., 40° C.) at 6,000 r/min for 10 minutes, and the aqueous phase was removed. Thus, a fat or oil was obtained.

Subsequently, water was added at 10% relative to the fat or oil, and the resultant was heated to 70° C. and stirred at 500 r/min for 20 minutes. After that, the mixture was centrifuged at 6,000 r/min for 10 minutes. The water washing procedure was repeated three times.

The fat or oil was taken out of the centrifuge tube, and subjected to dehydration treatment with stirring under conditions of 70° C. and 0.1 kPa.

The fat or oil was loaded into a 2 L glass Claisen flask and subjected to contact treatment with water vapor under the following conditions for 30 minutes: temperature: 150° C., pressure: 0.4 kPa, amount of water vapor: 2% relative to oil/h. Thus, an oil phase was obtained.

[Preparation of Liquid Seasoning]

Raw materials for an aqueous phase shown in Table 2, excluding egg yolk, were mixed and sterilized by heating at 80° C. for 4 minutes, and the mixture was cooled to ordinary temperature. 67 Parts by mass of the oil phase obtained above was added to 33 parts by mass of the aqueous phase supplemented with egg yolk, followed by preliminary emulsification, and the resultant was homogenized with a colloid mill (3,000 r/min, clearance: 0.08 mm), to thereby produce a mayonnaise having an average particle diameter of from 2.0 μm to 3.5 μm. The resultant mayonnaise was filled into a 100 g plastic tube-type container, and used as a sample.

Comparative Example 7

Preparation of Oil Phase and Liquid Seasoning

A mayonnaise having a ratio shown in Table 2 was produced in the same manner as in Example 12 using, as an oil phase, rapeseed oil (Nisshin rapeseed salad oil: manufactured by The Nisshin OilliO Group, Ltd.), and used as a sample.

[Evaluation of Taste and Flavor]

The samples were separately stored with no exposure to light at 40° C. for 2 weeks or with exposure to light at 20° C. for 2 weeks and then left to stand for about 4 hours at room temperature, and two expert panelists evaluated their taste and flavor (degradation odor) in accordance with the following criteria. After that, discussion was made to determine the final scores. The results are shown in Table 4.

5: Having no degradation odor
4: Having little degradation odor
3: Having degradation odor
2: Having strong degradation odor
1: Having very strong degradation odor

TABLE 4

| | | | Example 12 | Comparative Example 7 |
|---|---|---|---|---|
| Condition (1) | Kind of acid | — | Sodium L-ascorbate | None |
| | Concentration | [mass %] | 0.2% | |
| | Addition amount of aqueous solution | [%-Relative to oil] | 50% | |
| | Temperature | [° C.] | 70 | |
| | Time | [min] | 240 | |
| Water washing conditions | Temperature | [° C.] | 70 | None |
| | Time | [min] | 20 | |
| | Addition amount of water | [%-Relative to oil] | 10% | |
| Condition (2) | Temperature | [° C.] | 150 | None |
| | Time | [min] | 30 | |
| | Gauge pressure | [kPa] | 0.4 | |
| | Amount of water vapor | [%-Relative to oil/hr] | 2% | |
| Evaluation | 40° C., 2 weeks | | 5 | 4 |
| | Exposure to light, 2 weeks | | 5 | 4.5 |

As is apparent from Table 4, it found that, in the acidic oil-in-water emulsified composition prepared by the method of the present invention, time-dependent degradation of taste and flavor was further suppressed (Example 12).

Example 13

Preparation of Oil Phase

An aqueous solution of an organic acid (salt) shown in the condition (1) in Table 5 was added to a fat or oil obtained by mixing, at a ratio of 75:25, 375 g of rapeseed oil (Nisshin rapeseed salad oil: manufactured by The Nisshin OilliO Group, Ltd.) and 125 g of linseed oil (Linseed oil: manufactured by Summit Oil Mill Co., Ltd., content of ALA in fatty acids: 25%, unsaturated fatty acid content: 94.9%, the same applies hereinafter) at 50% relative to the fat or oil, and the resultant was heated to 70° C. and stirred under a nitrogen stream at 500 r/min for 4 hours. After that, the mixture was centrifuged (centrifuge machine: manufactured by Hitachi, Ltd., 40° C.) at 6,000 r/min for 10 minutes, and the aqueous phase was removed. Thus, a fat or oil was obtained.

Subsequently, water was added at 10% relative to the fat or oil, and the resultant was heated to 70° C. and stirred at 500 r/min for 20 minutes. After that, the mixture was centrifuged at 6,000 r/min for 10 minutes. The water washing procedure was repeated three times.

The fat or oil was taken out of the centrifuge tube, and subjected to dehydration treatment with stirring under conditions of 70° C. and 0.1 kPa.

The fat or oil was loaded into a 2 L glass Claisen flask and subjected to contact treatment with water vapor under the following conditions for 60 minutes: temperature: 180° C., pressure: 0.4 kPa, amount of water vapor: 2% relative to oil/h. Thus, an oil phase was obtained.

[Preparation of Liquid Seasoning]

Raw materials for an aqueous phase shown in Table 2, excluding egg yolk, were mixed and sterilized by heating at 80° C. for 4 minutes, and the mixture was cooled to ordinary temperature. 67 Parts by mass of the oil phase obtained above was added to 33 parts by mass of the aqueous phase supplemented with egg yolk, followed by preliminary emulsification, and the resultant was homogenized with a colloid mill (3,000 r/min, clearance: 0.08 mm), to thereby produce a mayonnaise having an average particle diameter of from 2.0 μm to 3.5 μm. The resultant mayonnaise was filled into a 100 g plastic tube-type container, and used as a sample.

Comparative Example 8

Preparation of Oil Phase and Liquid Seasoning

A mayonnaise having a ratio shown in Table 2 was produced in the same manner as in Example 13 using, as an oil phase, a fat or oil obtained by mixing, at a ratio of 75:25, 375 g of rapeseed oil (Nisshin rapeseed salad oil: manufactured by The Nisshin OilliO Group, Ltd.) and 125 g of linseed oil (Linseed oil: manufactured by Summit Oil Mill Co., Ltd.), and used as a sample.

[Evaluation of Taste and Flavor]

The samples were separately stored with no exposure to light at 40° C. for 2 weeks or with exposure to light at 20° C. for 2 weeks and then left to stand for about 4 hours at room temperature, and two expert panelists evaluated their taste and flavor (degradation odor) in accordance with the above-mentioned criteria. After that, discussion was made to determine the final scores. The results are shown in Table 5.

TABLE 5

|  |  |  | Example 13 | Comparative Example 8 |
|---|---|---|---|---|
| Condition (1) | Kind of acid | — | Sodium L-ascorbate | None |
|  | Concentration | [mass %] | 0.2% |  |
|  | Addition amount of aqueous solution | [%-Relative to oil] | 50% |  |
|  | Temperature | [° C.] | 70 |  |
|  | Time | [min] | 240 |  |
| Water washing conditions | Temperature | [° C.] | 70 | None |
|  | Time | [min] | 20 |  |
|  | Addition amount of water | [%-Relative to oil] | 10% |  |
| Condition (2) | Temperature | [° C.] | 180 | None |
|  | Time | [min] | 60 |  |
|  | Gauge pressure | [kPa] | 0.4 |  |
|  | Amount of water vapor | [%-Relative to oil/hr] | 2% |  |
| Evaluation | 40° C., 2 weeks |  | 4 | 2 |
|  | Exposure to light, 2 weeks |  | 4.5 | 3 |

As is apparent from Table 5, the acidic oil-in-water emulsified composition prepared by the conventional method was significantly degraded in taste and flavor with time, and had a strong degradation odor (Comparative Example 8). Meanwhile, it found that, in the acidic oil-in-water emulsified composition prepared by the method of the present invention, time-dependent degradation of taste and flavor was suppressed.

Example 14

Preparation of Oil Phase

An aqueous solution of 0.0001% sodium L-ascorbate shown in the condition (1) in Table 6 was added to a fat or oil obtained by mixing, at a ratio of 9:1, 450 g of rapeseed oil (Nisshin rapeseed salad oil: manufactured by The Nisshin OilliO Group, Ltd.) and 50 g of fish oil (DHA-27: manufactured by Nippon Suisan Kaisha, Ltd.) at 5% relative to the fat or oil, and the resultant was heated to 70° C. and stirred under a nitrogen stream at 500 r/min for 4 hours. After that, the mixture was centrifuged (centrifuge machine: manufactured by Hitachi, Ltd., 40° C.) at 6,000 r/min for 10 minutes, and the aqueous phase was removed. Thus, a fat or oil was obtained.

The fat or oil was taken out of the centrifuge tube and subjected to dehydration treatment with stirring under conditions of 70° C. and 0.1 kPa.

The fat or oil was loaded into a 2 L glass Claisen flask and subjected to contact treatment with water vapor under the following conditions for 30 minutes: temperature: 150° C., pressure: 0.4 kPa, amount of water vapor: 2% relative to oil/h. Thus, an oil phase was obtained.

[Preparation of Liquid Seasoning]

Raw materials for an aqueous phase shown in Table 7, excluding egg yolk, were mixed, and the mixture was sterilized by heating at 80° C. for 4 minutes and cooled to ordinary temperature. 40 Parts by mass of the oil phase obtained above was added to 60 parts by mass of the aqueous phase supplemented with egg yolk, and the resultant was emulsified using a TK homodisper (Tokushu Kika Kogyo Co., Ltd.) at 3,000 r/min for 10 minutes, to thereby produce an emulsion-type dressing. The resultant dressing was filled into a 100 mL plastic container, and used as a sample.

Comparative Example 9

Preparation of Liquid Seasoning

An emulsion-type dressing having a ratio shown in Table 7 was produced in the same manner as in Example 14 using, as an oil phase, a fat or oil obtained by mixing, at a ratio of 9:1, 450 g of rapeseed oil (Nisshin rapeseed salad oil: manufactured by The Nisshin OilliO Group, Ltd.) and 50 g of fish oil (DHA-27: manufactured by Nippon Suisan Kaisha, Ltd.), and used as a sample.

[Evaluation of Taste and Flavor]

The samples were separately stored at 40° C. for 5 days or with exposure to light for 5 days and then left to stand for about 4 hours at room temperature, and two expert panelists evaluated their taste and flavor (fishy odor) in accordance with the following criteria. After that, discussion was made to determine the final scores. The results are shown in Table 6.

5: No fishy odor is sensed.
4: Fishy odor is hardly sensed.
3: Fishy odor is slightly sensed.
2: Fishy odor is sensed.
1: Fishy odor is strongly sensed.

TABLE 6

|  |  |  | Example 14 | Comparative Example 9 |
|---|---|---|---|---|
| Condition (1) | Kind of acid | — | Sodium L-ascorbate | None |
|  | Concentration | [mass %] | 0.0001% |  |
|  | Addition amount of aqueous solution | [%-Relative to oil] | 5% |  |
|  | Temperature | [° C.] | 70 |  |
|  | Time | [min] | 240 |  |
| Water washing conditions | Temperature | [° C.] | None | None |
|  | Time | [min] |  |  |
|  | Addition amount of water | [%-Relative to oil] |  |  |
| Condition (2) | Temperature | [° C.] | 150 | None |
|  | Time | [min] | 30 |  |
|  | Gauge pressure | [kPa] | 0.4 |  |
|  | Amount of water vapor | [%-Relative to oil/hr] | 2% |  |
| Evaluation | 40° C., 5 days |  | 5 | 3 |
|  | Exposure to light, 5 days |  | 5 | 3 |

TABLE 7

|  |  | (mass %) |
|---|---|---|
| Aqueous phase | Vinegar | 13.85 |
|  | Soy sauce | 10 |
|  | Superfine sugar | 7 |
|  | Sesame | 6 |
|  | Dietary salt | 1.85 |
|  | Frozen egg yolk | 0.5 |
|  | Mustard powder | 0.15 |
|  | Sodium glutamate | 0.1 |
|  | Xanthan gum | 0.07 |
|  | Water | Balance |
| Oil phase |  | 40 |
| Total |  | 100 |

As is apparent from Table 6, the acidic oil-in-water emulsified composition prepared by a conventional method was degraded in taste and flavor with time, and had a fishy odor (Comparative Example 9). Meanwhile, it found that, in the acidic oil-in-water emulsified composition prepared by the method of the present invention, time-dependent degradation of the taste and flavor was suppressed.

Example 15

Preparation of Oil Phase 1,000 Parts by mass of fish oil (omevulital 1812 Gold: manufactured by BASF, total content of DHA and EPA in fatty acids: 35%, amount of unsaturated fatty acid: 69.2%, the same applies hereinafter) was deaerated under reduced pressure under conditions of 70° C. and 0.7 kPa to achieve a dissolved oxygen concentration of 0.3 ppm or less.

An aqueous solution of an organic acid salt shown in the condition (1) in Table 8 was added at 50% relative to the fat or oil, and the mixture was heated to 70° C. and stirred at 500 r/min for 2 hours while the mixture was bubbled with nitrogen gas. After that, the resultant was left to stand at 70° C. for 30 minutes to separate the mixture, and the aqueous phase was removed. Thus, a fat or oil was obtained.

Subsequently, water having been subjected to a nitrogen bubbling method so as to have a dissolved oxygen concentration of 0.1 ppm or less was added at 50% relative to the fat or oil, and the mixture was heated to 70° C. and stirred at 500 r/min for 30 minutes while the mixture was bubbled with nitrogen gas. The flow rate of nitrogen gas was adjusted to 30 L/hr-relative to 1 kg of the fat or oil. After that, the mixture was left to stand at 70° C. for 30 minutes to separate the mixture. This water washing procedure was repeated three times.

The fat or oil was taken out and subjected to dehydration treatment with stirring under conditions of 70° C. and 0.7 kPa.

A rosemary extract was added at 0.5% relative to the fat or oil after the dehydration, and the resultant was loaded into a 2 L glass Claisen flask, and subjected to contact treatment with water vapor for 180 minutes under the condition (2) shown in Table 8, that is, under the following conditions: temperature: 180° C., pressure: 1.5 kPa, amount of water vapor: 1.5%-relative to the oil/hr. Thus, an oil phase was obtained.

[Preparation of Liquid Seasoning]

Raw materials for an aqueous phase shown in Table 9, excluding egg yolk, were mixed, and the mixture was sterilized by heating at 80° C. for 4 minutes and cooled to ordinary temperature. 4 Parts by mass of the oil phase obtained above and 63 parts by mass of rapeseed oil were added to 33 parts by mass of the aqueous phase supplemented with egg yolk, followed by preliminary emulsification, and the resultant was homogenized with a colloid mill (3,000 r/min, clearance: 0.08 mm), to there by produce a mayonnaise having an average particle diameter of from 2.0 µm to 3.5 µm. The resultant mayonnaise was filled into a 100 g plastic tube-type container, and used as a sample.

Example 16 to Example 19

Preparation of Oil Phase

In the same manner as in Example 15, an aqueous solution of any of the organic acids (salts) shown in the condition (1) in Table 8 was added at 50% relative to the fat or oil having been subjected to the deoxygenation treatment, and the mixture was stirred while bubbling with nitrogen gas, followed by removal of the aqueous phase. Thus, a fat or oil was obtained.

Subsequently, water was added at 50% relative to the fat or oil, and the mixture was stirred in the same manner as in Example 15 while the mixture was bubbled with nitrogen gas, and left to stand at 70° C. for 30 minutes to separate the mixture. This water washing procedure was repeated three times.

The fat or oil was taken out and subjected to dehydration treatment with stirring under conditions of 70° C. and 0.7 kPa.

In the same manner as in Example 15, a rosemary extract was added at 0.5% relative to the fat or oil after dehydration, and the resultant was loaded into a 2 L glass Claisen flask, and subjected to contact treatment with water vapor under the condition (2) in Table 8. Thus, an oil phase was obtained and used as an oil phase component.

[Preparation of Liquid Seasoning]

Mayonnaises each having a ratio shown in Table 9 were produced in the same manner as in Example 15 using the oil phase obtained above, and used as samples.

Example 20

Preparation of Oil Phase

An aqueous solution of an organic acid salt shown in the condition (1) in Table 8 was added to fish oil at 50% relative to the fat or oil, and the mixture was stirred in the same manner as in Example 15 while the mixture was bubbled with nitrogen gas, followed by removal of the aqueous phase. Thus, a fat or oil was obtained.

Subsequently, in the same manner as in Example 15, water having been subjected to deoxygenation treatment was added at 50% relative to the fat or oil, and the mixture was stirred while the mixture was bubbled with nitrogen gas, and left to stand at 70° C. for 30 minutes to separate the mixture. This water washing procedure was repeated three times.

The fat or oil was taken out of the centrifuge tube, and subjected to dehydration treatment with stirring under conditions of 70° C. and 0.7 kPa.

In the same manner as in Example 15, a rosemary extract was added at 0.5% relative to the fat or oil after dehydration, and the resultant was loaded into a 2 L glass Claisen flask, and subjected to contact treatment with water vapor under the condition (2) in Table 8. Thus, an oil phase was obtained and used as an oil phase component.

[Preparation of Liquid Seasoning]

A mayonnaise having a ratio shown in Table 9 was produced in the same manner as in Example 15 using the oil phase obtained above, and used as a sample.

Example 21

Preparation of Oil Phase

An aqueous solution of an organic acid salt shown in the condition (1) in Table 8 was added to fish oil at 50% relative to the fat or oil, and the mixture was stirred in the same manner as in Example 15 while the mixture was bubbled with nitrogen gas, followed by removal of the aqueous phase. Thus, a fat or oil was obtained.

Subsequently, water was added at 50% relative to the fat or oil, and the mixture was stirred in the same manner as in Example 15 while the mixture was bubbled with nitrogen gas, and left to stand at 70° C. for 30 minutes to separate the mixture. This water washing procedure was repeated three times.

The fat or oil was taken out, and subjected to dehydration treatment with stirring under conditions of 70° C. and 0.7 kPa.

In the same manner as in Example 15, a rosemary extract was added at 0.5% relative to the fat or oil after dehydration, and the resultant was loaded into a 2 L glass Claisen flask and subjected to contact treatment with water vapor under the condition (2) in Table 8. Thus, an oil phase was obtained and used as an oil phase component.

[Preparation of Liquid Seasoning]

A mayonnaise having a ratio shown in Table 9 was produced in the same manner as in Example 15 using the oil phase obtained above, and used as a sample.

Comparative Example 10

Preparation of Oil Phase

In the same manner as in Example 15, an aqueous solution of an organic acid salt shown in the condition (1) in Table 8 was added at 50% relative to the fat or oil having been subjected to the deoxygenation treatment, and the mixture was stirred while bubbling with nitrogen gas, followed by removal of the aqueous phase. Thus, a fat or oil was obtained.

Subsequently, water was added at 50% relative to the fat or oil, and the mixture was stirred in the same manner as in Example 15 while the mixture was bubbled with nitrogen gas, and left to stand at 70° C. for 30 minutes to separate the mixture. This water washing procedure was repeated three times.

The fat or oil was taken out, and subjected to dehydration treatment with stirring under conditions of 70° C. and 0.7 kPa.

[Preparation of Liquid Seasoning]

A mayonnaise having a ratio shown in Table 9 was produced in the same manner as in Example 15 except that 4 parts by mass of the fat or oil after the dehydration obtained above and 63 parts by mass of rapeseed oil were added as the oil phase to 33 parts by mass of the aqueous phase supplemented with egg yolk, and used as a sample.

Comparative Example 11

Preparation of Oil Phase and Liquid Seasoning

A mayonnaise having a ratio shown in Table 9 was produced in the same manner as in Example 15 except that 4 parts by mass of fish oil (DHA-27: manufactured by Nippon Suisan Kaisha, Ltd.) and 63 parts by mass of rapeseed oil were added as the oil phase to 33 parts by mass of the aqueous phase supplemented with egg yolk, and used as a sample.

[Evaluation of Taste and Flavor]

The samples were separately stored with no exposure to light at 40° C. for 2 weeks or with no exposure to light at 40° C. for 4 weeks and then left to stand for about 4 hours at room temperature, and two expert panelists evaluated their taste and flavor (fishy odor) in accordance with the following criteria. After that, discussion was made to determine the final scores. The results are shown in Table 8.
5: No fishy odor is sensed.
4: Fishy odor is hardly sensed.
3: Fishy odor is slightly sensed.
2: Fishy odor is sensed.
1: Fishy odor is strongly sensed.

TABLE 8

| | | | Example 15 | Example 16 | Example 17 | Example 18 | Example 19 | Example 20 | Example 21 | Comparative Example 10 | Comparative Example 11 |
|---|---|---|---|---|---|---|---|---|---|---|---|
| Condition (1) | Deoxygenation treatment of fat or oil | — | Present | Present | Present | Present | Present | Absent | Absent | Present | None |
| | Kind of acid | — | Sodium L-ascorbate | Sodium L-ascorbate | Sodium L-ascorbate | Sodium L-ascorbate | Citric acid | Sodium L-ascorbate | Sodium L-ascorbate | Sodium L-ascorbate | |
| | Concentration | [mass %] | 2 | 2 | 2 | 2 | 2 | 2 | 2 | 2 | |
| | Addition amount of aqueous solution | [%-Relative to oil] | 50 | 50 | 50 | 50 | 50 | 50 | 50 | 50 | |
| | Temperature | [° C.] | 70 | 70 | 70 | 70 | 70 | 70 | 70 | 70 | |
| | Time | [min] | 120 | 120 | 120 | 120 | 120 | 120 | 120 | 120 | |
| | Flow rate of nitrogen gas | [L/hr-Relative to 1 kg of oil] | 30 | 30 | 30 | 30 | 30 | 30 | 30 | 30 | |
| Water washing conditions | Deoxygenation treatment of water | — | Present | Absent | Absent | Absent | Absent | Present | Absent | Absent | None |
| | Addition amount of water | [%-Relative to oil] | 50 | 50 | 50 | 50 | 50 | 50 | 50 | 50 | |

TABLE 8-continued

|  |  |  | Example 15 | Example 16 | Example 17 | Example 18 | Example 19 | Example 20 | Example 21 | Comparative Example 10 | Comparative Example 11 |
|---|---|---|---|---|---|---|---|---|---|---|---|
|  | Temperature | [° C.] | 70 | 70 | 70 | 70 | 70 | 70 | 70 | 70 |  |
|  | Time | [min] | 30 | 30 | 30 | 30 | 30 | 30 | 30 | 30 |  |
| Condition (2) | Temperature | [° C.] | 180 | 180 | 180 | 180 | 180 | 180 | 180 | None | None |
|  | Time | [min] | 180 | 180 | 180 | 180 | 180 | 180 | 180 |  |  |
|  | Gauge pressure | [kPa] | 1.5 | 1.5 | 1.5 | 2.1 | 1.5 | 1.5 | 1.5 |  |  |
|  | Amount of water vapor | [%/hr-Relative to oil] | 1.5 | 1.5 | 0.75 | 1.5 | 1.5 | 1.5 | 1.5 |  |  |
| Evaluation | 40° C., 2 weeks |  | 5.0 | 4.5 | 4.5 | 4.5 | 4.0 | 5.0 | 4.0 | 2.0 | 1.0 |
|  | 40° C., 4 weeks |  | 4.5 | 4.5 | 4.5 | 4.5 | 4.0 | 4.5 | 4.0 | 2.0 | 1.0 |

TABLE 9

|  |  | (mass %) |
|---|---|---|
| Aqueous phase | Egg yolk supplemented with 10% salt | 15 |
|  | Vinegar | 6.7 |
|  | Superfine sugar | 1 |
|  | Dietary salt | 0.6 |
|  | Sodium glutamate | 0.4 |
|  | Mustard powder | 0.3 |
|  | Water | Balance |
| Oil phase |  | 67 |
| Total |  | 100.0 |

As is apparent from Table 8, the mayonnaise prepared by a conventional method was significantly degraded in taste and flavor with time and had a strong fishy odor (Comparative Example 11). The sample of Comparative Example 10 having not been subjected to treatment to bring the fat or oil into contact with water vapor were degraded in taste and flavor with time and had a fishy odor. Meanwhile, it found that, in the mayonnaise prepared by the method of the present invention, time-dependent degradation of the taste and flavor was suppressed.

Meanwhile, the fats or oils prepared in Examples and Comparative Examples were stored and then evaluated on their taste and flavor in the same manner as in the above-mentioned section [Evaluation of Taste and Flavor]. As a result, the fat or oil of Comparative Example 11 was found to be degraded in its taste and flavor.

The invention claimed is:

1. A method of producing a liquid seasoning, the method comprising (1), (2), and (3):
   (1) adding, at a temperature of 40° C. to 70° C., an aqueous solution of at least one member selected from the group consisting of ascorbic acid and a salt thereof to a fat or oil and stirring the mixture, then washing the fat or oil with water, and performing an oil-water separation, wherein an addition amount of the aqueous solution is from 10% to 100% with respect to the total content of fat or oil, wherein from 5 mass % to 100 mass % of the fat or oil is fish oil, algae oil, or a combination thereof;
   (2) bringing the fat or oil after said (1) adding into contact with water vapor at a rate of 0.5% per one hour to 10% per one hour, with respect to the fat or oil, under a pressure of from 0.01 kPa to 5 kPa and at a temperature of 130° C. to 200° C.; and
   (3) bringing the fat or oil obtained from said (2) bringing, as an oil phase component, into contact with an aqueous phase.

2. The method of producing a liquid seasoning according to claim 1, wherein the fat or oil of said (1) adding comprises linseed oil or fish oil.

3. The method of producing a liquid seasoning according to claim 1, wherein, prior to said washing, the concentration of the aqueous solution of ascorbic acid or a salt thereof is from 0.1 mass % to 20 mass %.

4. The method of producing a liquid seasoning according to claim 1, wherein, prior to said washing, the addition amount of the aqueous solution of ascorbic acid or a salt thereof is from 20 mass % to 80 mass % with respect to the fat or oil.

5. The method of producing a liquid seasoning according to claim 1, wherein the period of time for contact of the fat or oil with water vapor is from 0.5 minute to 90 minutes.

6. The method of producing a liquid seasoning according to claim 1, wherein the usage amount of the water in the washing is from 1 mass % to 50 mass % with respect to the fat or oil.

7. A method of producing a liquid seasoning, the method comprising (4), (5), and (6):
   (4) adding an aqueous solution of at least one member selected from the group consisting of ascorbic acid and a salt thereof to a fat or oil, and subjecting the mixture to bubbling with an inert gas and stirring, then washing the fat or oil with water, and performing an oil-water separation, wherein from 5 mass % to 100 mass % of the fat or oil is fish oil, algae oil, or a combination thereof,
   wherein an addition amount of the aqueous solution is from 10% to 100% with respect to the total content of fat or oil;
   (5) bringing the fat or oil after said (4) adding into contact with water vapor at a rate of 0.5% per one hour to 10% per one hour, with respect to the fat or oil, under a reduced pressure of from 0.01 kPa to 5 kPa and at a temperature of 130° C. to 200° C.; and
   (6) bringing the fat or oil obtained from said (5) bringing, as an oil phase component, into contact with an aqueous phase.

8. The method of producing a liquid seasoning according to claim 7, wherein the fat or oil to be subjected to said (4) adding comprises 75 mass % or more of fish oil.

9. The method of producing a liquid seasoning according to claim 7, further comprising subjecting the water to be used for washing to a deoxygenation treatment before said washing.

10. The method of producing a liquid seasoning according to claim 7, further comprising subjecting the fat or oil to a deoxygenation treatment prior to said (4) adding.

11. The method of producing a liquid seasoning according to claim 1, wherein the liquid seasoning has a mass ratio of oil phase/aqueous phase of from 10/90 to 80/20.

12. The method of producing a liquid seasoning according to claim 1, wherein the liquid seasoning comprises mayonnaise.

13. The method of producing a liquid seasoning according to claim 1, wherein the temperature at which the fat or oil is brought into contact with water vapor is from 130° C. to 180° C.

14. The method of producing a liquid seasoning according to claim 7, wherein the temperature at which the fat or oil is brought into contact with water vapor is from 130° C. to 180° C.

15. The method of producing a liquid seasoning according to claim 1, wherein the fat or oil is at least one member selected from the group consisting of linseed oil, perilla oil, algae oil and fish oil.

16. The method of producing a liquid seasoning according to claim 7, wherein the fat or oil is at least one member selected from the group consisting of linseed oil, perilla oil, algae oil and fish oil.

* * * * *